(12) United States Patent
Aimone

(10) Patent No.: US 12,554,173 B2
(45) Date of Patent: Feb. 17, 2026

(54) OPTICAL DEVICE WITH VERTICAL WAVEGUIDE STRUCTURE

(71) Applicant: Nokia Solutions and Networks Oy, Espoo (FI)

(72) Inventor: Alessandro Aimone, Berlin (DE)

(73) Assignee: Nokia Solutions and Networks Oy, Espoo (FI)

( * ) Notice: Subject to any disclaimer, the term of this patent is extended or adjusted under 35 U.S.C. 154(b) by 274 days.

(21) Appl. No.: 18/192,564

(22) Filed: Mar. 29, 2023

(65) Prior Publication Data

US 2023/0333440 A1   Oct. 19, 2023

(30) Foreign Application Priority Data

Apr. 19, 2022   (EP) .................................... 22168709

(51) Int. Cl.
  *G02F 1/225*   (2006.01)
  *G02F 1/21*   (2006.01)
  *G02F 1/01*   (2006.01)

(52) U.S. Cl.
  CPC ............ *G02F 1/2257* (2013.01); *G02F 1/212* (2021.01); *G02F 1/0147* (2013.01); *G02F 2201/127* (2013.01); *G02F 2202/10* (2013.01); *G02F 2203/50* (2013.01)

(58) Field of Classification Search
  CPC ...... G02F 1/2257; G02F 1/212; G02F 1/0147; G02F 2201/127; G02F 2202/10; G02F 2203/50
  See application file for complete search history.

(56) References Cited

U.S. PATENT DOCUMENTS

| 5,511,084 | A |   | 4/1996 | Amann |
|---|---|---|---|---|
| 5,673,140 | A | * | 9/1997 | Fisher ..................... G02F 2/004  359/332 |
| 5,828,679 | A | * | 10/1998 | Fisher ................. G02F 1/01716  359/344 |

(Continued)

FOREIGN PATENT DOCUMENTS

JP   2000-321452 A   11/2000

OTHER PUBLICATIONS

Jung et al., A very short vertical directional coupler with polarization-insensitive high extinction ratios, Optics Communications 281 (2008) 260-264. (Year: 2008).*
Patel et al., Frequency response of dual-drive silicon photonic modulators with coupling between electrodes, Opt. Express 26, 8904-8915 (2018) (Year: 2018).*
Nishiyama et al., Si-Photonics-Based Layer-to-Layer Coupler Toward 3D Optical Interconnection, IEICE Trans. Electron., vol. E101-C, No. Jul. 7, 2018 (Year: 2018).*

(Continued)

*Primary Examiner* — Peter Radkowski
(74) *Attorney, Agent, or Firm* — Duft & Bornsen, PC

(57) ABSTRACT

An optical device includes a semiconductor substrate having a major surface, and an optical waveguide structure on the major surface. The optical waveguide structure comprises a lower optical core, an upper optical core, and an intermediate optical cladding, where the upper optical core is vertically above the lower optical core and the intermediate optical cladding separates and is in contact with the optical cores. The optical cores are optically coupled in first and second sections of the optical waveguide structure near the respective first and second ends, and the optical waveguide structure has a parallel pair of optical waveguides extending from the first section to the second section with each of the optical waveguides including one of the optical cores.

18 Claims, 19 Drawing Sheets

(56) References Cited

U.S. PATENT DOCUMENTS

| | | | |
|---|---|---|---|
| 5,859,866 | A | 1/1999 | Forrest et al. |
| 6,330,378 | B1 | 12/2001 | Forrest et al. |
| 6,385,376 | B1 | 5/2002 | Bowers et al. |
| 6,693,937 | B2* | 2/2004 | Steffens ............. H01S 5/06256 372/50.1 |
| 7,424,181 | B2* | 9/2008 | Haus .................... G02F 1/3132 385/16 |
| 7,768,649 | B2 | 8/2010 | Heebner |
| 8,581,356 | B2* | 11/2013 | Pennock ................ H10D 8/00 257/E29.326 |
| 8,948,555 | B1 | 2/2015 | Roth et al. |
| 9,764,352 | B2* | 9/2017 | Heideman ............. G02F 1/0134 |
| 10,514,499 | B2* | 12/2019 | Novack ............. G02B 6/12007 |
| 10,715,887 | B2* | 7/2020 | Seok .................... G02B 6/3502 |
| 11,409,036 | B2* | 8/2022 | Novack ............. G02B 6/12016 |
| 2003/0035455 | A1* | 2/2003 | Steffens ............. H01S 5/06256 372/50.1 |
| 2004/0126072 | A1* | 7/2004 | Hoon Lee ............. G02B 6/122 385/27 |
| 2005/0275921 | A1* | 12/2005 | Haus .................... G02B 6/3536 359/247 |
| 2006/0174657 | A1 | 8/2006 | Koyama et al. |
| 2006/0210216 | A1 | 9/2006 | Lee et al. |
| 2010/0164068 | A1* | 7/2010 | Pennock ................ H10D 8/00 257/E29.326 |
| 2016/0202502 | A1* | 7/2016 | Heideman ................ B05D 5/06 385/3 |
| 2019/0227230 | A1* | 7/2019 | Novack .................. H04B 10/40 |
| 2019/0253775 | A1* | 8/2019 | Seok .................. G02B 6/12002 |
| 2020/0096701 | A1* | 3/2020 | Novack ................ G02B 6/4215 |
| 2021/0173280 | A1 | 6/2021 | Fowler et al. |
| 2021/0231876 | A1 | 7/2021 | Kumar |

OTHER PUBLICATIONS

Dogru et al., Traveling Wave Electrodes for Substrate Removed Electro-Optic Modulators With Buried Doped Semiconductor Electrodes, in IEEE Journal of Quantum Electronics, vol. 49, No. 7, pp. 599-606, Jul. 2013, doi: 10.1109/JQE.2013.2262925 (Year: 2013).*

Simola et al., CMOS-Compatible Bias-Tunable Dual-Band Detector Based on GeSn/Ge/Si Coupled Photodiodes, ACS Photonics 2021, 8, 2166-2173 (Year: 2021).*

Watanabe et al, Vertically stacked coupler and serially grafted waveguide: Hybrid waveguide structures formed using an electro-optic polymer, J. Appl. Phys. 83 (2), Jan. 15, 1998 (Year: 1998).*

Meighan et al., "Design of 100 GHz-class Mach-Zehnder modulators in a generic indium phosphide platform", 2020 IEEE Photonics Conference (IPC), Sep. 28-Oct. 1, 2020, 2 pages.

Thomson et al., "Low Loss MMI Couplers for High Performance MZI Modulators", IEEE Photonics Technology Letters, vol. 22, No. 20, Oct. 2010, pp. 1485-1487.

Kaiser et al., "Medium and large scale Mach-Zehnder modulator ICs on InP for fabrication of advanced transmitters", 14th International Conference on Transparent Optical Networks (ICTON), Jul. 2-5, 2012, pp. 1-4.

Shi et al., "Compact low-birefringence polarization beam splitter using vertical-dual-slot waveguides in silicon carbide integrated platforms", Photonics Research, vol. 10, No. 1, Jan. 2022, pp. A8-A13.

Extended European Search Report received for corresponding European Patent Application No. 22168709.8, dated Oct. 10, 2022, 9 pages.

European Office action; Application 22168709.8; 11 pages; Oct. 15, 2025.

* cited by examiner

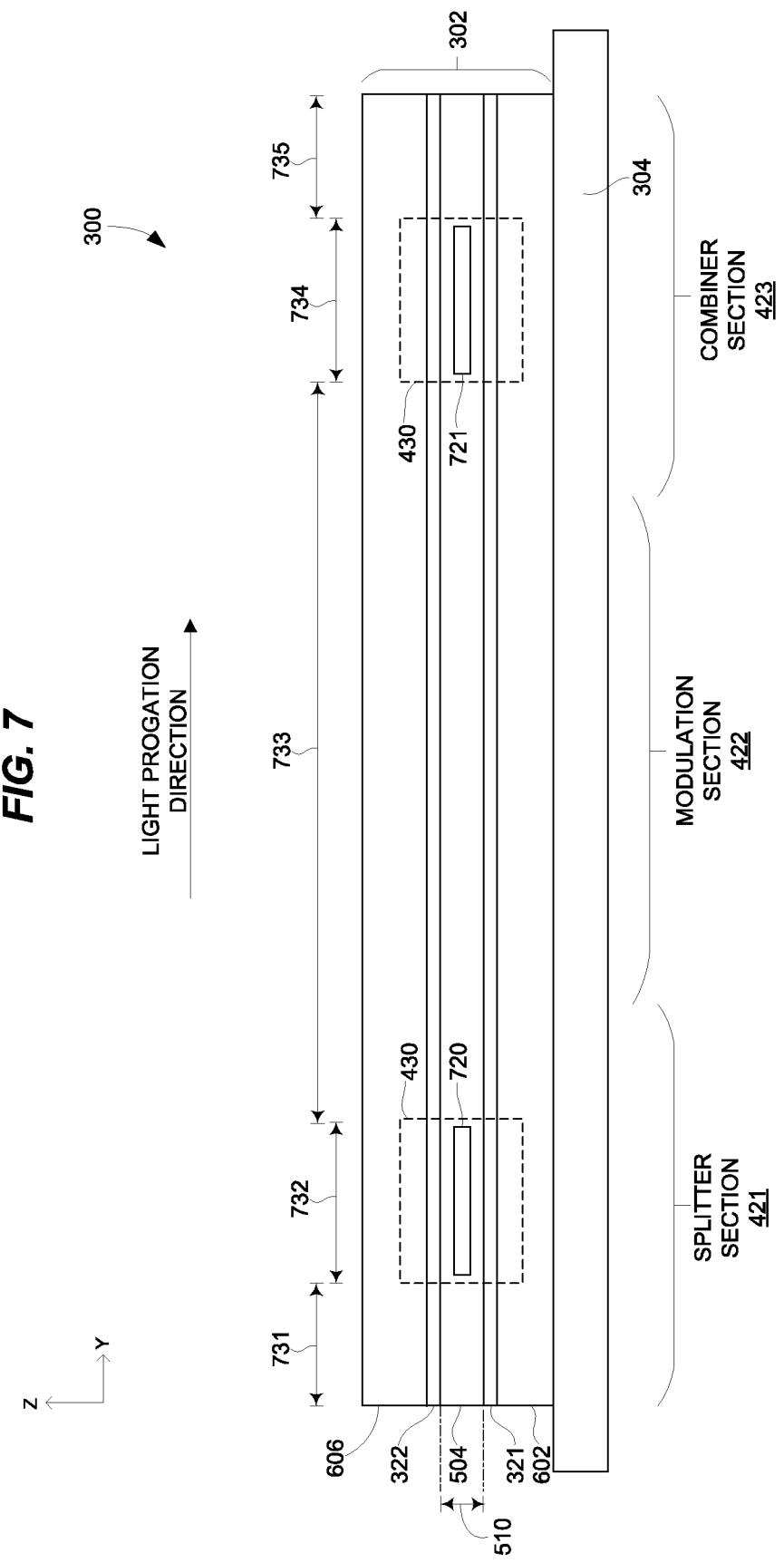

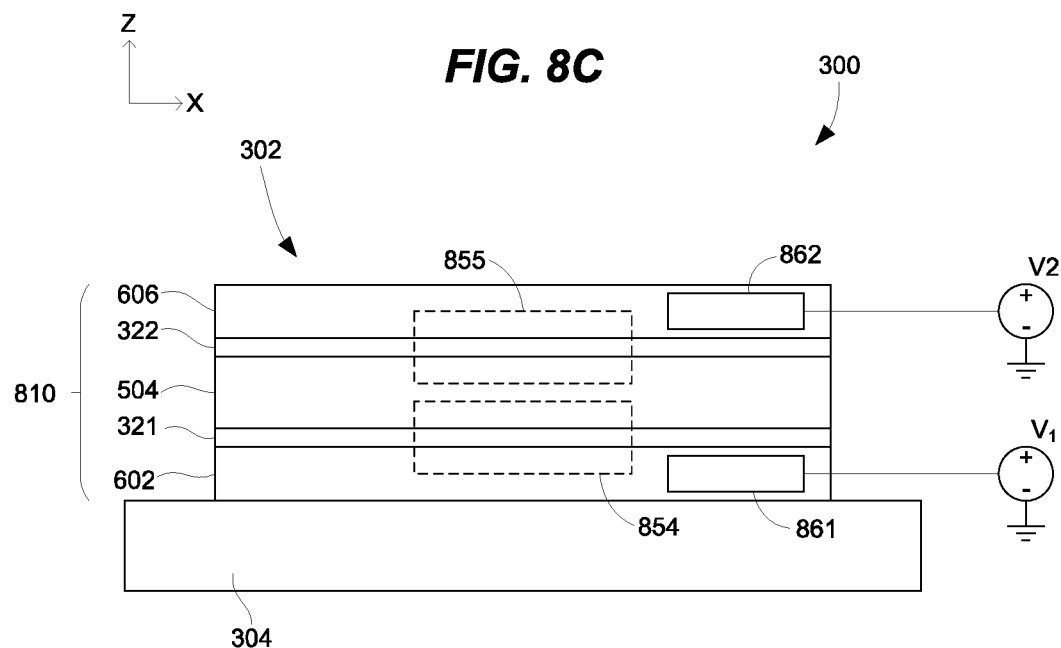
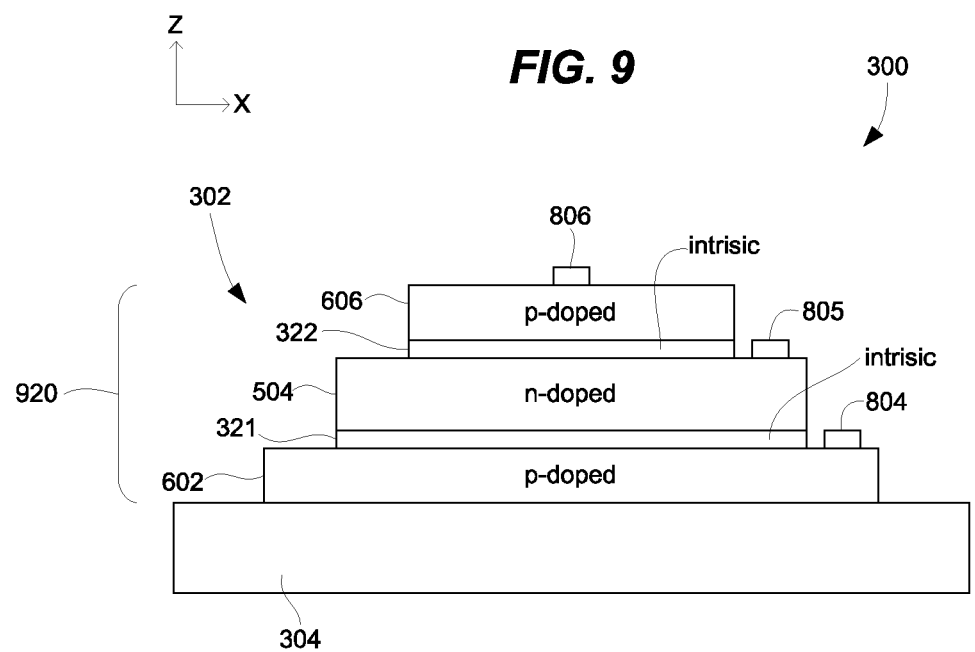

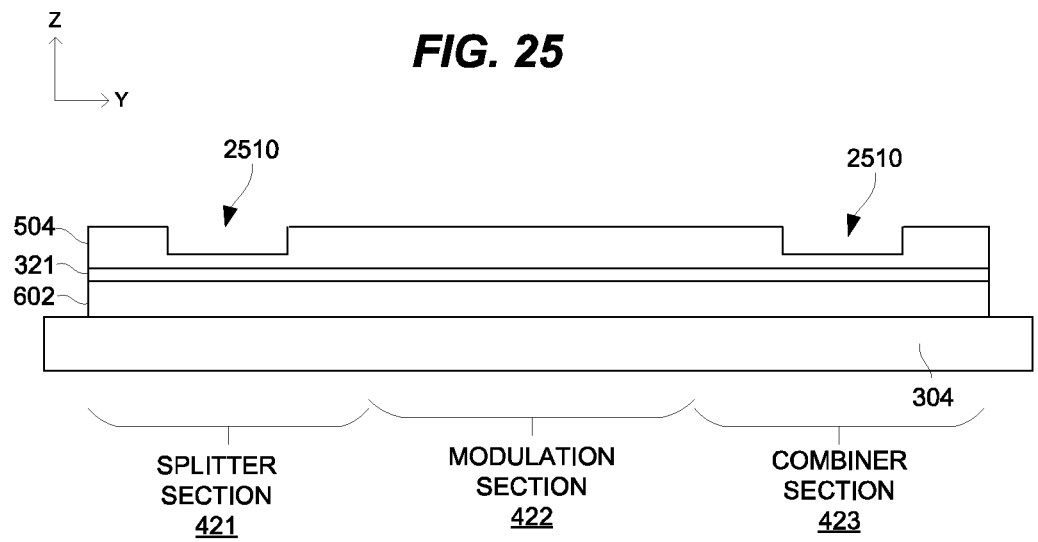
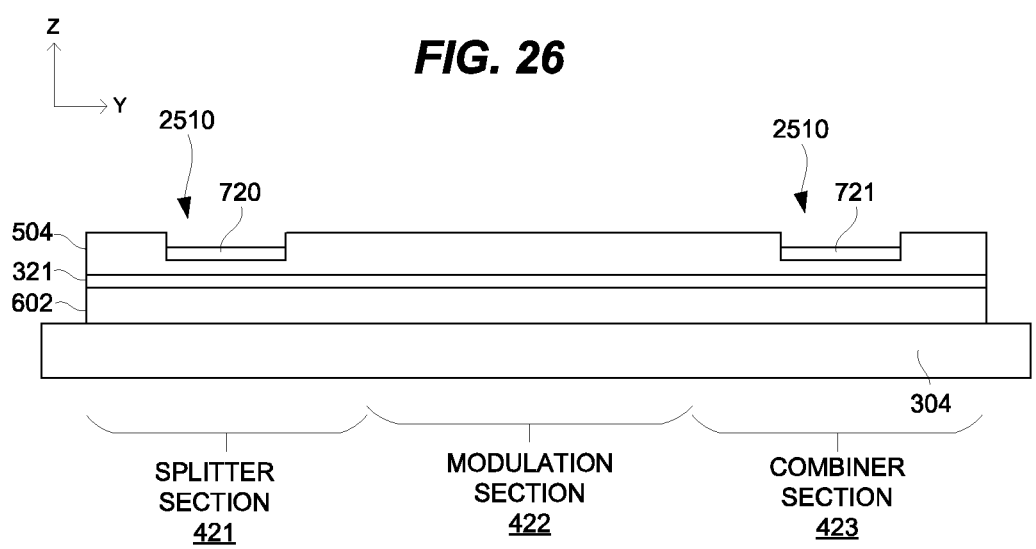

OPTICAL DEVICE WITH VERTICAL WAVEGUIDE STRUCTURE

TECHNICAL FIELD

This disclosure is related to the field of optical communications and, in particular, to optical devices.

BACKGROUND

Fast transfer of large volumes of data on an optical medium is the base of today's communications. Integrated components play a key role in optical communications, as they allow for higher data rate and lower cost with respect to their discreet counterparts. One type of integrated component is a Mach-Zehnder modulator that modulates the amplitude and/or phase of light, thus putting information on a light beam.

The structure of a conventional Mach-Zehnder modulator comprises an input optical waveguide that is split into a pair of optical modulation arms, and then recombined into an output optical waveguide. Optical power launched into the input optical waveguide is split among the different optical paths of the optical modulation arms. In one (or both) of the optical modulation arms, a segment thereof provides for phase modulation of the light beam therein with an optical phase shifter that changes the refractive index (n) of the segment of the optical modulation arm thereby causing an accumulated phase of light propagating through the optical modulation arm to change. For example, the optical phase shifter may comprise an electro-optic phase shifter where an electrical field is applied across the optical path, a thermo-optic phase shifter where heat is applied across the optical path, etc. When the light propagating along the different optical modulation arms is recombined, the relative phase difference between the light propagating through the two different optical paths causes interference thereof in an optical combiner thereby causing amplitude and/or phase modulation of the output optical beam.

One challenge with conventional Mach-Zehnder modulators is the structure is formed in a planar fashion with the optical modulation arms disposed side-by-side. This puts strict requirements on the resolution and controllability of the fabrication processes, which are hard to meet. Also, the size of the modulators can be relatively large.

SUMMARY

Described herein are enhanced optical devices and methods of fabricating optical devices. An optical device as described herein includes a waveguide structure that has vertically-stacked optical waveguides. The vertically-stacked optical waveguides perform the functions of an optical modulator, such as Input/Output (I/O) coupling, splitting, modulation, and/or combining. One technical benefit of vertically-stacked optical waveguides is the modulator structure is moved to the vertical axis, and the fabrication resolution required for planar fabrication processes is replaced with vertical resolution that is highly-controllable. Another technical benefit of the vertically-stacked optical waveguides is a more compact size for an optical modulator.

In a first embodiment, an optical device comprises a semiconductor substrate having a major surface, and an optical waveguide structure on the major surface. The optical waveguide structure comprises a lower optical core, an upper optical core, and an intermediate optical cladding. One or more of the lower and upper optical cores extends from a first end of the optical waveguide structure to a second end thereof. The upper optical core is vertically above the lower optical core in a direction perpendicular to the major surface, and the intermediate optical cladding separates and is in contact with the optical cores. The optical cores are optically coupled in first and second sections of the optical waveguide structure near the respective first and second ends. The optical waveguide structure has a parallel pair of optical waveguides extending from the first section to the second section, with each of the optical waveguides including one of the optical cores.

In any first embodiment, a separation of the optical cores may be less in the first and second sections than between the first and second sections.

In any first embodiment, the optical waveguide structure may further comprise an intermediate optical core segment interposed between the lower optical core and the upper optical core in one or more of the first and second sections.

In any first embodiment, the lower optical core, the intermediate optical cladding, and the upper optical core may be semiconductor layers. In some embodiments with such semiconductor structures, the lower optical core, the intermediate optical cladding, and the upper optical core may be III-V semiconductors.

In any first embodiment, the optical waveguide structure may include a p-n-p or an n-p-n semiconductor-junction structure along a direction perpendicular to the major surface.

In any first embodiment, the optical waveguide structure may further comprise a lower optical cladding on the semiconductor substrate, where the lower optical core is above a part of the lower optical cladding in a direction perpendicular to the major surface and is in contact with the lower optical cladding.

In any first embodiment, the optical waveguide structure further may comprise a lower optical cladding separating the lower optical core from the semiconductor substrate, and an upper optical cladding may be formed on the upper optical core.

In any first embodiment, the optical device may comprise a Mach-Zehnder optical modulator. In such embodiments, the optical waveguides of the parallel pair are parallel optical arms of the Mach-Zehnder optical modulator, and one or more of the optical arms have a segment configured as an electro-optical phase shifter. In any such embodiment, one or more of the optical waveguides may have a thermo-optical phase shifter along a segment thereof. In any embodiment of this paragraph, the Mach-Zehnder optical modulator may comprise one or more radio frequency traveling wave electrodes along the segment of the optical arm(s). In any embodiment of this paragraph, the segment of the optical arm(s) may include a semiconductor junction therealong, where the semiconductor junction is in the optical waveguide structure.

In a second embodiment, a method of fabricating an optical device having an optical waveguide structure is disclosed. The method comprises acquiring a semiconductor substrate, and forming the optical waveguide structure on a major surface of the semiconductor substrate. Forming the optical waveguide structure comprises forming a lower optical core, forming an intermediate optical cladding on the lower optical core, and forming an upper optical core on the intermediate optical cladding. One or more of the lower and upper optical cores extends from a first end of the optical waveguide structure to a second end thereof. The optical cores are optically coupled in first and second sections of the optical waveguide structure near the respective first and second ends. The optical waveguide structure has a parallel pair of optical waveguides extending from the first section to the second section, with each of the optical waveguides including one of the optical cores.

In some second embodiments, forming the intermediate optical cladding may comprise growing the intermediate optical cladding with a varying cladding thickness along a length of the waveguide structure using a selective area growth process.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

FIG. 7 is a cross-sectional view of an optical device in another illustrative embodiment.

FIGS. 8A-8C are cross-sectional views of an optical device in an illustrative embodiment.

FIGS. 9-10 are cross-sectional views of an optical device in illustrative embodiments.

FIGS. 22-28 illustrate results of the fabrication steps of FIG. 21 in an illustrative embodiment.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
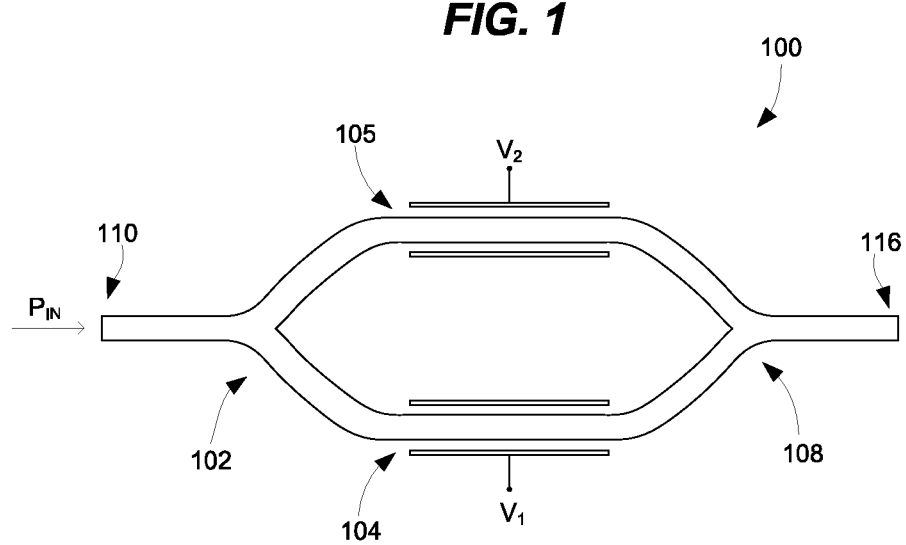
FIG. 1 is a schematic diagram of a conventional Mach-Zehnder modulator.

FIG. 1 is a schematic diagram of a conventional Mach-Zehnder modulator 100. Mach-Zehnder modulator 100 comprises an optical splitter 102, a pair of optical modulation arms 104-105, and an optical combiner 108. Input power ($P_{IN}$) from a laser or another source (not shown) is launched into an input port 110, and is split at optical splitter 102 to be shared by optical modulation arm 104 and optical modulation arm 105 (e.g., the power splitting may cause about equal amounts of the light from input port 110 to be directed to each of the optical modulation arms 104 and 105). One or both of the optical modulation arms 104-105 has a segment therealong configured to act as an optical phase shifter when driven by a modulation voltage ($V_1$ or $V_2$). A modulation voltage applied across the segment of the optical modulation arm 104-105 alters the refractive index of the segment and changes a phase shift accumulated by the light propagating therethrough. Optical combiner 108 combines the light from the two optical modulation arms 104-105. In the optical combiner 108, the light from the optical modulation arms 104-105 constructively or destructively interferes depending on an accumulated phase difference between the light from the different optical modulation arms 104-105. Due to the interference in the optical combiner 108, the phase difference between the light results in an amplitude and/or phase modulation of the output light at output port 116.

Figure 2:
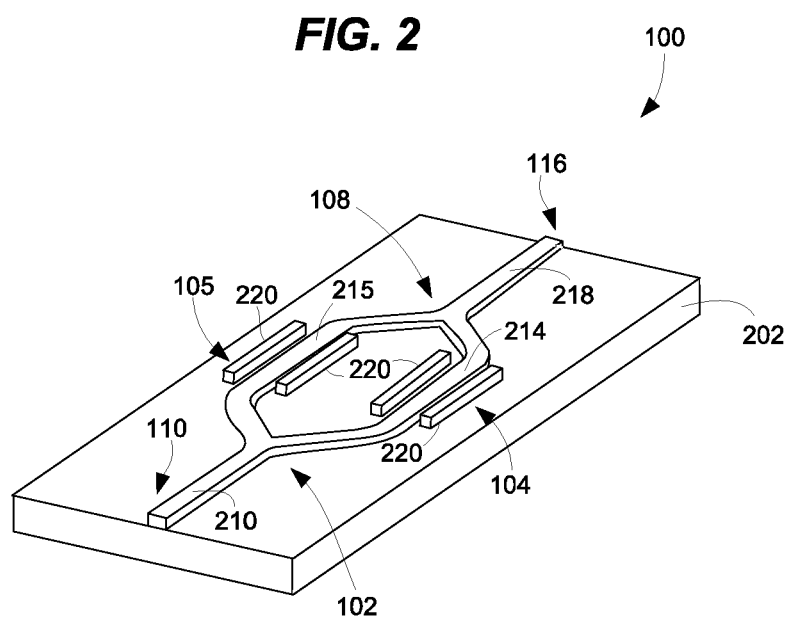
FIG. 2 is an isometric view of a conventional Mach-Zehnder modulator.

FIG. 2 is an isometric view of a conventional Mach-Zehnder modulator 100. Mach-Zehnder modulator 100 is formed on a substrate 202. In this example, an input optical waveguide 210 is split into two optical waveguides 214-215 of the optical modulation arms 104-105 to form the optical splitter 102. The optical waveguides 214-215 of the optical modulation arms 104-105 are again combined into an output optical waveguide 218 to form the optical combiner 108. Electrodes 220 are formed on either side of the optical waveguides 214-215 for the optical modulation arms 104-105 to apply a modulation driving voltage ($V_1$ or $V_2$). Electrodes 220 may be implemented as radio frequency (RF), traveling wave electrodes.

Mach-Zehnder modulator 100 is formed in a planar fashion on substrate 202 with the optical waveguides 214-215 of the optical modulation arms 104-105 disposed side-by-side. This puts strict requirements on the resolution and controllability of fabrication technology used to build the Mach-Zehnder modulator 100. In particular, the intrinsic fabrication tolerances of optical waveguide definition processes (few hundreds of nanometers), e.g., between the two optical modulation arms 104-105, are large enough to disrupt the operation of components. Also, the size of the modulators can be relatively large when the optical waveguides 214-215 are formed side-by-side in this manner.

FIG. 2 is just one example of a conventional Mach-Zehnder modulator 100 to show the planar relationship of the optical waveguides. Other types of Mach-Zehnder modulators also share a similar type of planar design.

Figure 3:
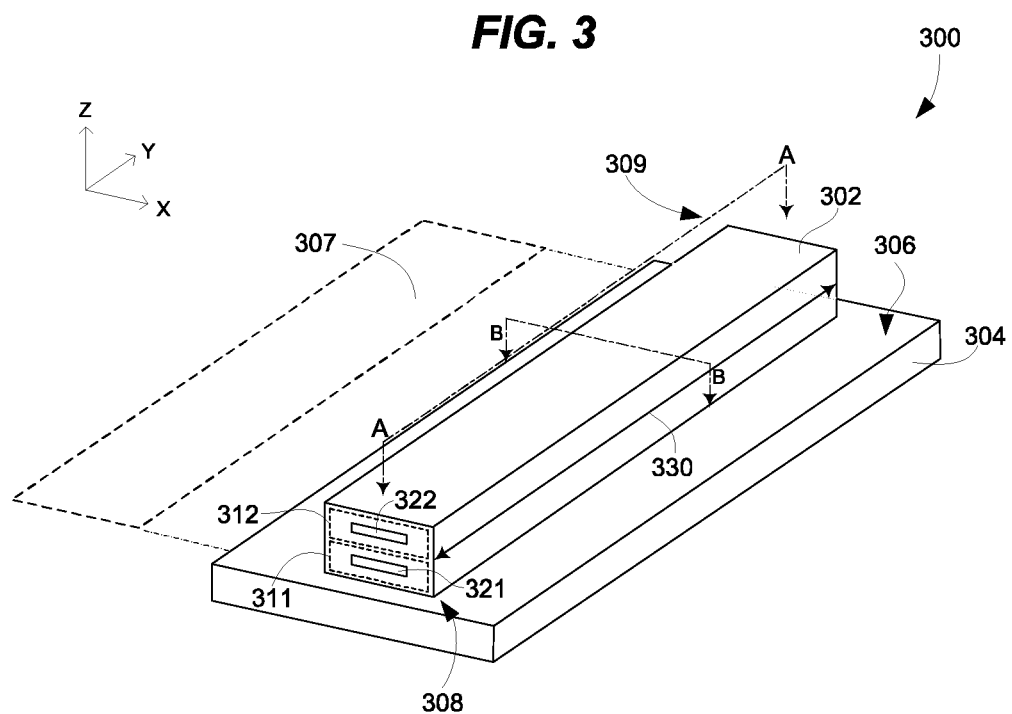
FIG. 3 is an isometric view of an optical device in an illustrative embodiment.

FIG. 3 is an isometric view of an optical device 300 in an illustrative embodiment. Optical device 300 is an apparatus that includes an optical waveguide structure 302 that forms or is configured as an optical modulator. An optical modulator is a type of device that manipulates a property of light, such as a Mach-Zehnder modulator. Waveguide structure 302 is grown or formed vertically (i.e., along the z-axis) on a semiconductor substrate 304. Substrate 304 and various layers of waveguide structure 302 may be formed from III-V semiconductor materials, such as Indium phosphide (InP), Indium gallium arsenide (InGaAs), Gallium arsenide (GaAs), Gallium nitride (GaN), or various other crystalline III-V alloys. However, substrate 304 and various layers of waveguide structure 302 may alternatively be formed from II-VI semiconductor alloys, silicon, and/or silicon germanium alloys.

Waveguide structure 302 includes a lower optical waveguide 311 and an upper optical waveguide 312, at least one of which extends along its length 330 from one end 308 to another end 309. Lower optical waveguide 311 includes a lower optical core 321 disposed longitudinally along length 330, and upper optical waveguide 312 includes an upper optical core 322 disposed longitudinally along length 330. An optical core has a higher refractive index than an optical media (e.g., an optical cladding) that transversely surrounds the optical core thereby enabling substantial confinement of light and the guiding of light propagation therealong. In this embodiment, lower optical waveguide 311 and upper optical waveguide 312 have a vertical relation with respect to one another with upper optical waveguide 312 disposed above lower optical waveguide 311 in the vertical direction (i.e., z-axis). More particularly, the top surface 306 is the major surface of substrate 304 that defines a horizontal plane 307 in the x-y axis. Lower optical core 321 and upper optical core 322 are disposed longitudinally, and are vertically separated or vertically spaced (e.g., along the z-axis) in relation to horizontal plane 307 by an intermediate optical cladding as described in more detail below. Upper optical core 322 and lower optical core 321 may be vertically stacked or vertically aligned as shown in FIG. 3. However, in some embodiments, there may be an offset between lower optical core 321 and upper optical core 322, lower optical core 321 and upper optical core 322 may have different widths, etc. Thus, in general, lower optical core 321 and upper optical core 322 are vertically separated and have a vertical relation such that a vertical plane disposed longitudinally along waveguide structure 302 intersects both lower optical core 321 and upper optical core 322.

Figure 4:
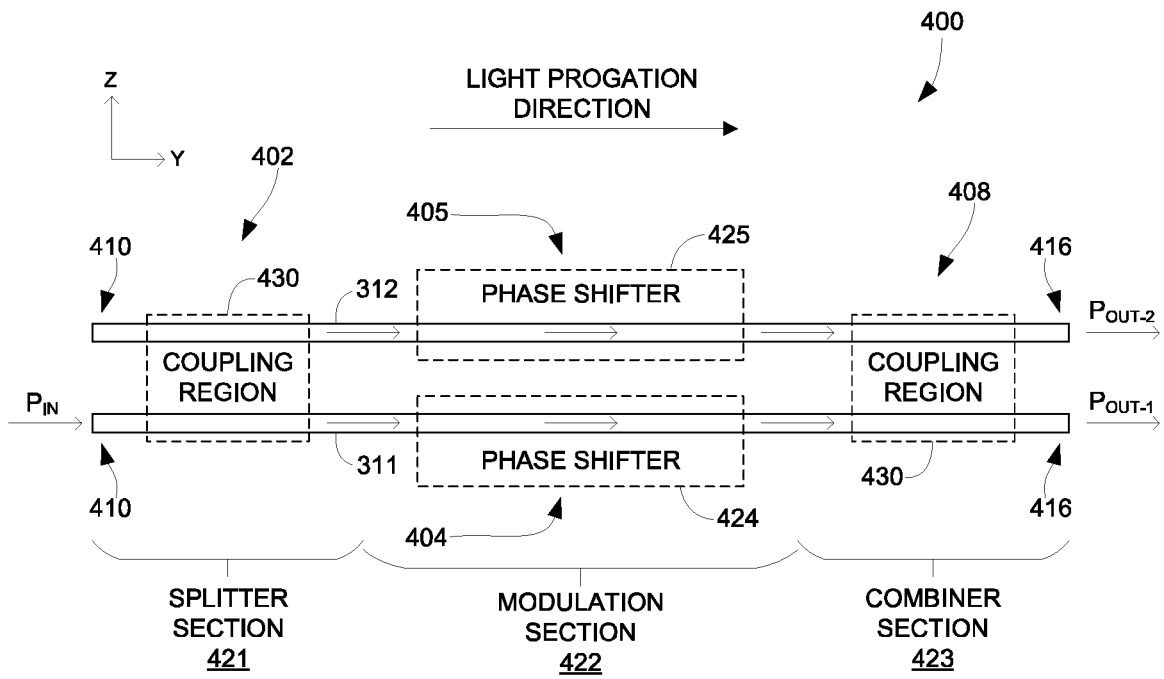
FIG. 4 is a schematic diagram of an optical modulator formed by a waveguide structure of FIG. 3 in an illustrative embodiment.

FIG. 4 is a schematic diagram of an optical modulator 400 formed by waveguide structure 302 of FIG. 3 in an illustrative embodiment. Optical modulator 400 may also be referred to as a Mach-Zehnder interferometer and modulator. Optical modulator 400 includes parallel pair of optical waveguides (i.e., lower optical waveguide 311 and upper optical waveguide 312) that are disposed longitudinally and are vertically separated along the z-axis. Optical waveguides 311-312 are illustrated as straight in this schematic diagram, but optical waveguides 311-312 do not need to be straight as will be discussed below.

Along the length 330 of waveguide structure 302 (i.e., from left to right in FIG. 4), optical modulator 400 sequentially comprises a splitter section 421, an optical modulation section 422, and a combiner section 423. Splitter section 421 operates as an optical power splitter for the optical modulator 400. Splitter section 421 includes an optical coupling region 430 where optical waveguides 311-312 are optically coupled. In an optical coupling region 430, optical cores of the optical waveguides 311-312 may be more closely spaced so that optical power is transferred from one of the optical waveguides to another of the optical waveguides due to the overlapping of light propagation mode profiles that are guided by the two optical waveguides 311-312. In other words, an optical guided mode of lower optical waveguide 311 is optically coupled to upper optical waveguide 312, and an optical guided mode of the upper optical waveguide 312 is optically coupled to lower optical waveguide 311, because the profiles of the optical propagation modes substantially overlap in the splitter section 421. Thus, splitter section 421 acts as a vertical, directional optical coupler 402 that splits or divides optical power between lower optical waveguide 311 and upper optical waveguide 312. Outside of the optical coupling region 430, optical waveguides 311-312 are well-separated and substantially optically uncoupled so that optical power is not transferred from one optical waveguide to the other optical waveguide.

In optical modulation section 422, lower optical waveguide 311 and upper optical waveguide 312 are well-separated and optically uncoupled. Lower optical waveguide 311 and upper optical waveguide 312 operate as optical arms or optical modulation arms 404-405 for the optical modulator 400 in optical modulation section 422.

Combiner section 423 operates as an optical combiner for the optical modulator 400. Combiner section 423 also includes an optical coupling region 430 where optical waveguides 311-312 are optically coupled. Thus, combiner section 423 acts as a vertical, directional optical coupler 408 that combines a portion of the optical power guided by lower optical waveguide 311 with a portion of the optical power guided by upper optical waveguide 312. Outside of optical coupling region 430, optical waveguides 311-312 are well-separated and substantially optically uncoupled so that optical power is not transferred from one optical waveguide to another.

In an example operation of optical modulator 400, input optical power ($P_{IN}$) from a laser or another source (not shown) is launched into one of the input ports 410. In this example, the input power is launched into the input port 410 of lower optical waveguide 311. As light is guided by lower optical waveguide 311 through the optical coupling region 430 of splitter section 421, the input optical power is split or divided between lower optical waveguide 311 (i.e., optical modulation arm 404) and upper optical waveguide 312 (i.e., optical modulation arm 405). It may be desirable to have a 50/50 split of incident optical power between the two optical modulation arms 404-405, but other splits are also within the scope of the embodiments described herein.

During operation, a segment of one or both of optical modulation arms 404-405 acts or is configured as an optical phase shifter 424-425, being configured to change the refractive index (n) of the segment of a corresponding optical modulation arm 404-405 in response to an electrical driving signal. For example, an optical phase shifter 424-425 may comprise an electro-optic phase shifter that applies an electrical field across an optical modulation arm 404-405. In another example, one or both of the optical phase shifters 424-425 may also comprise a slower thermo-optic phase shifter that applies heat to an optical modulation arm 404-405 (e.g., to cause a substantially fixed relative phase difference between light traversing the optical modulation arms 404-405). One or both of optical phase shifters 424-425 produce an adjustable phase change in light guided by optical waveguides 311-312. An arm of optical modulator 400 that includes one or more optical phase shifters 424-425 may be referred to as an "optical modulation arm", while an arm of optical modulator 400 that does not include an optical phase shifter 424-425 may be referred to as an "optical arm".

As the light guided by lower optical waveguide 311 and the light guided by upper optical waveguide 312 pass through the optical coupling region 430 of combiner section 423, the light input by both optical waveguides 311-312 constructively or destructively interferes depending on a phase difference therebetween. The phase difference is converted into amplitude and/or phase modulation of the output optical power (Pour) at output ports 416.

Figure 5:
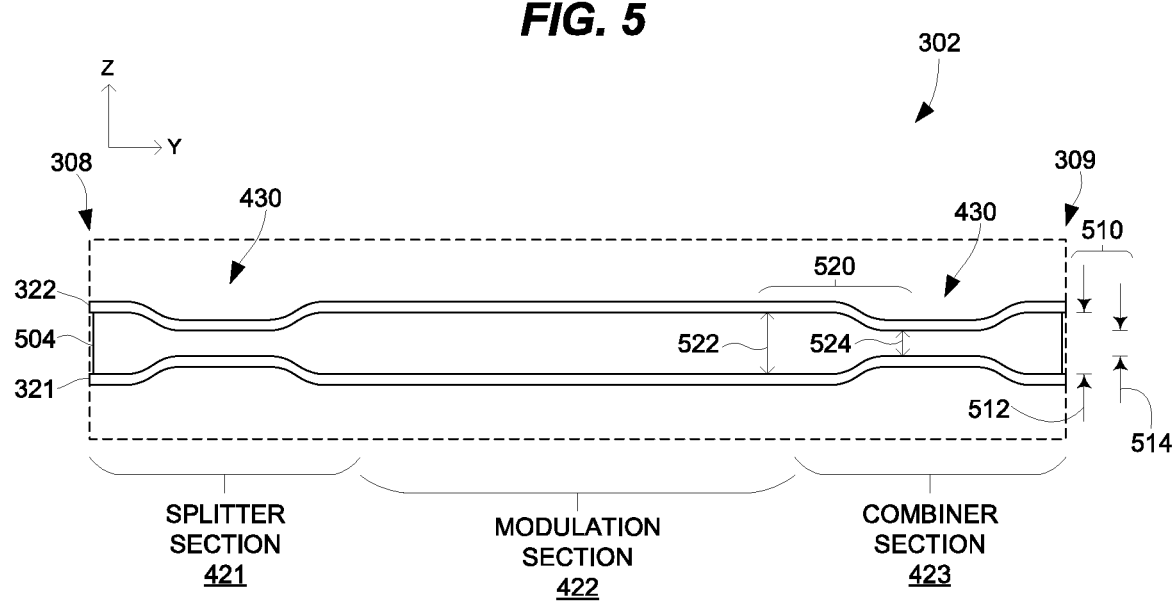
FIG. 5 is a schematic diagram of a waveguide structure in an illustrative embodiment.

FIG. 5 is a schematic diagram of waveguide structure 302 in an illustrative embodiment. The schematic diagram in FIG. 5 is of a side view of waveguide structure 302 to show a relationship between lower optical core 321 and upper optical core 322 along length 330. Waveguide structure 302 includes lower optical core 321, an intermediate optical cladding 504, and upper optical core 322. An optical cladding comprises one or more layers of material of a lower refractive index in contact with an optical core material of a higher refractive index. Lower optical core 321 is disposed longitudinally, and may extend along the length 330 of waveguide structure 302 between ends 308-309 (see FIG. 3). Intermediate optical cladding 504 is disposed longitudinally above lower optical core 321 (in the vertical direction) to extend along the length 330 of waveguide structure 302 between ends 308-309. Upper optical core 322 is disposed longitudinally above intermediate optical cladding 504 (in the vertical direction), and may extend along the length 330 of waveguide structure 302 between ends 308-309. Thus, upper optical core 322 is vertically above lower optical core 321 in a direction perpendicular to the major surface 306 of substrate 304.

Upper optical core 322 and lower optical core 321 are optically coupled in splitter section 421 near end 308, and are optically coupled in combiner section 423 near end 309.

In one embodiment, the cladding thickness 510 (i.e., along the z-axis) of intermediate optical cladding 504 varies along the length 330 of waveguide structure 302 (i.e., in the longitudinal direction) from a greater thickness where lower optical core 321 and upper optical core 322 are optically uncoupled, to a lesser thickness where lower optical core 321 and upper optical core 322 are optically coupled in the optical coupling region 430 of splitter section 421 and the optical coupling region 430 of combiner section 423. Consequently, a vertical separation 520 or vertical spacing between lower optical core 321 and upper optical core 322 varies along the length 330 of waveguide structure 302 to control whether lower optical core 321 and upper optical core 322 are optically coupled or uncoupled. The vertical separation 520 is less in the splitter section 421 and the combiner section 423 than between the splitter section 421 and the combiner section 423. More particularly, the cladding thickness 510 is at an "uncoupled" thickness 512 in areas of waveguide structure 302 where lower optical core 321 and upper optical core 322 are to be optically uncoupled. An uncoupled thickness 512 comprises a thickness that defines a vertical separation 522 where upper optical core 322 and lower optical core 321 are optically uncoupled so that optical power is not transferred between optical cores 321-322. The cladding thickness 510 is at a "coupled" thickness 514 in areas of waveguide structure 302 where lower optical core 321 and upper optical core 322 are to be optically coupled. A coupled thickness 514 comprises a thickness that defines a vertical separation 524 where upper optical core 322 and lower optical core 321 are optically coupled so that optical power is transferred between optical cores 321-322. The variable cladding thickness 510 therefore creates a variable coupling of upper optical core 322 and lower optical core 321 along the length 330 of waveguide structure 302.

Figure 6A:
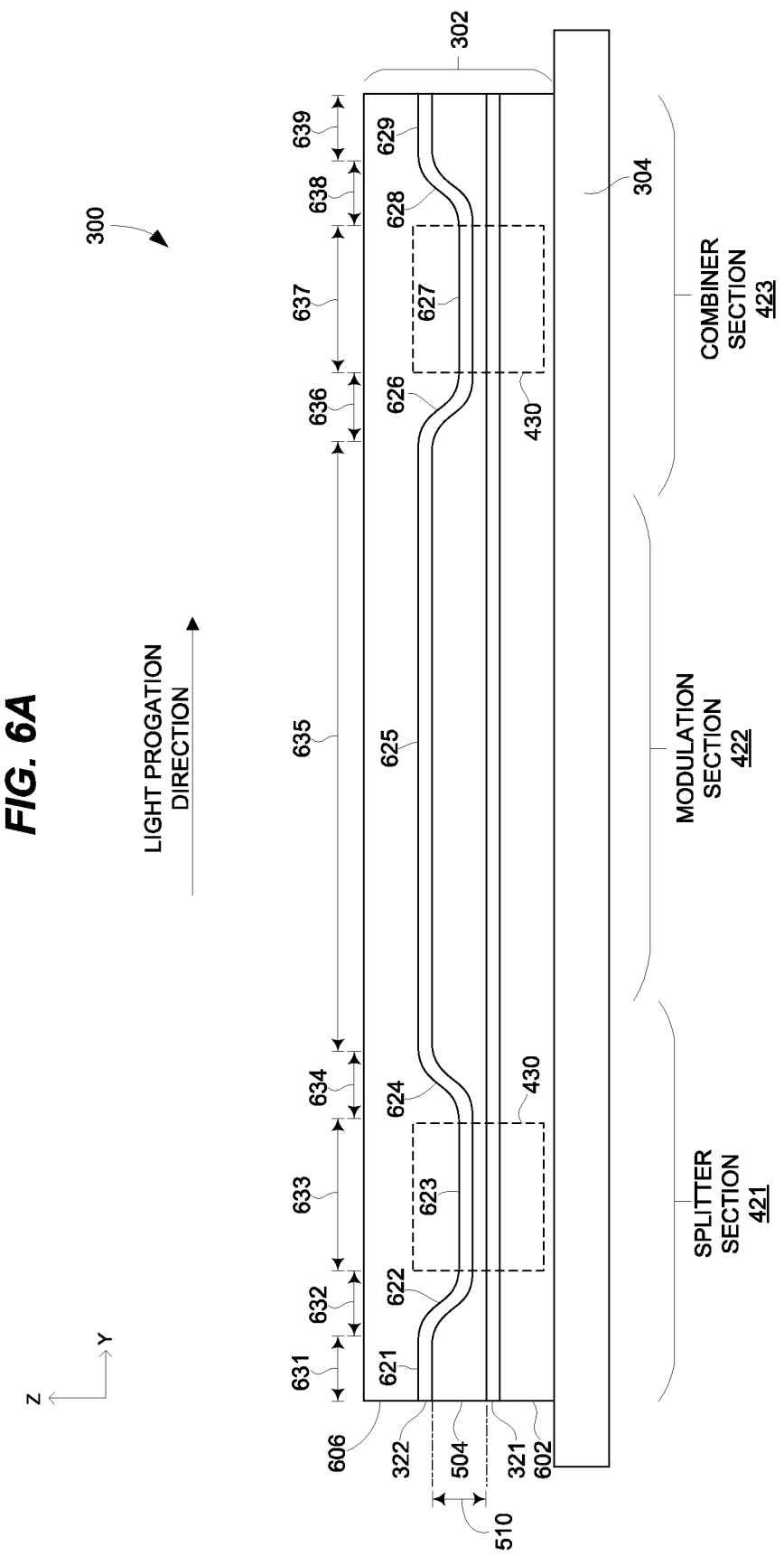
FIGS. 6A-6C are cross-sectional views of an optical device in illustrative embodiments.
Figure 6B:
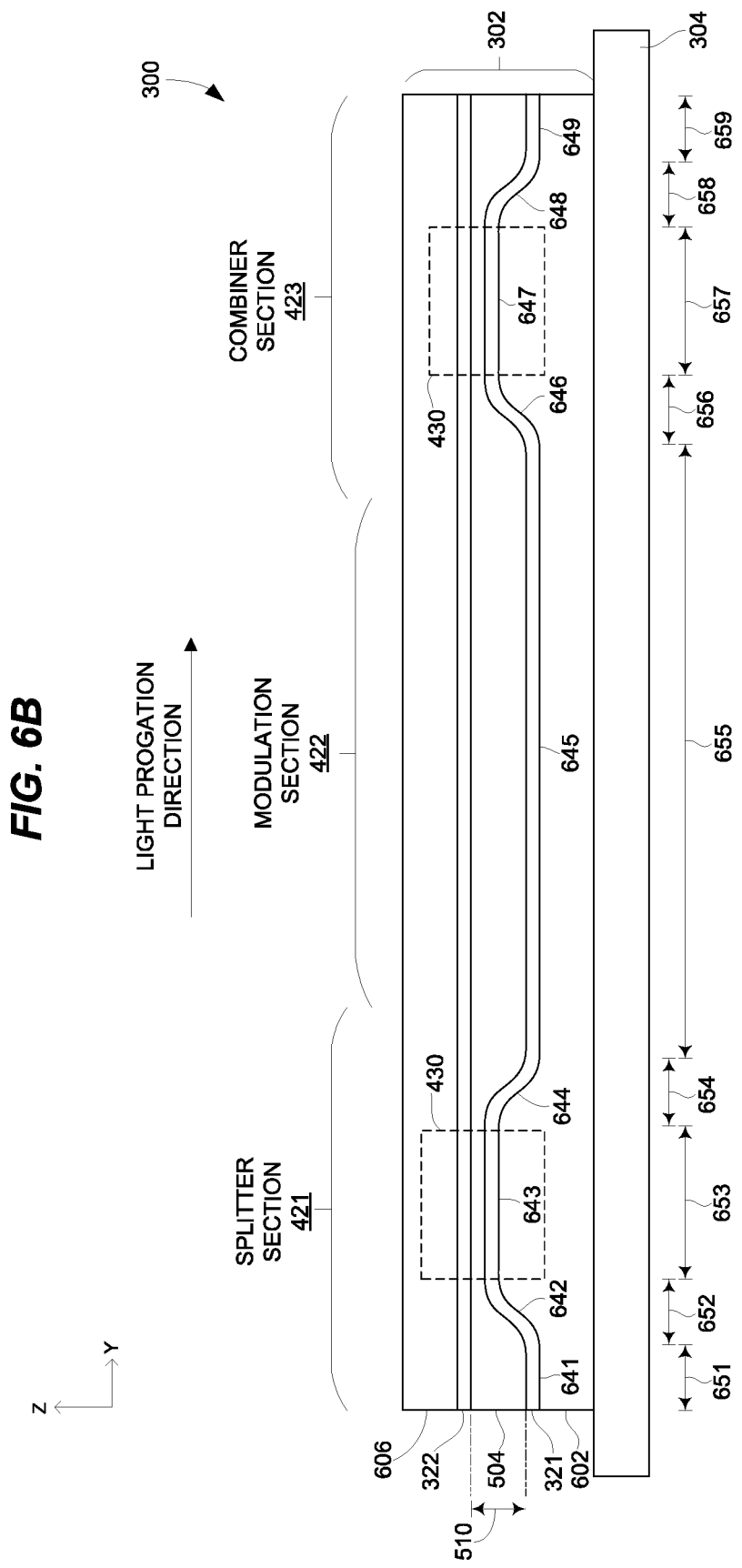
Figure 6C:
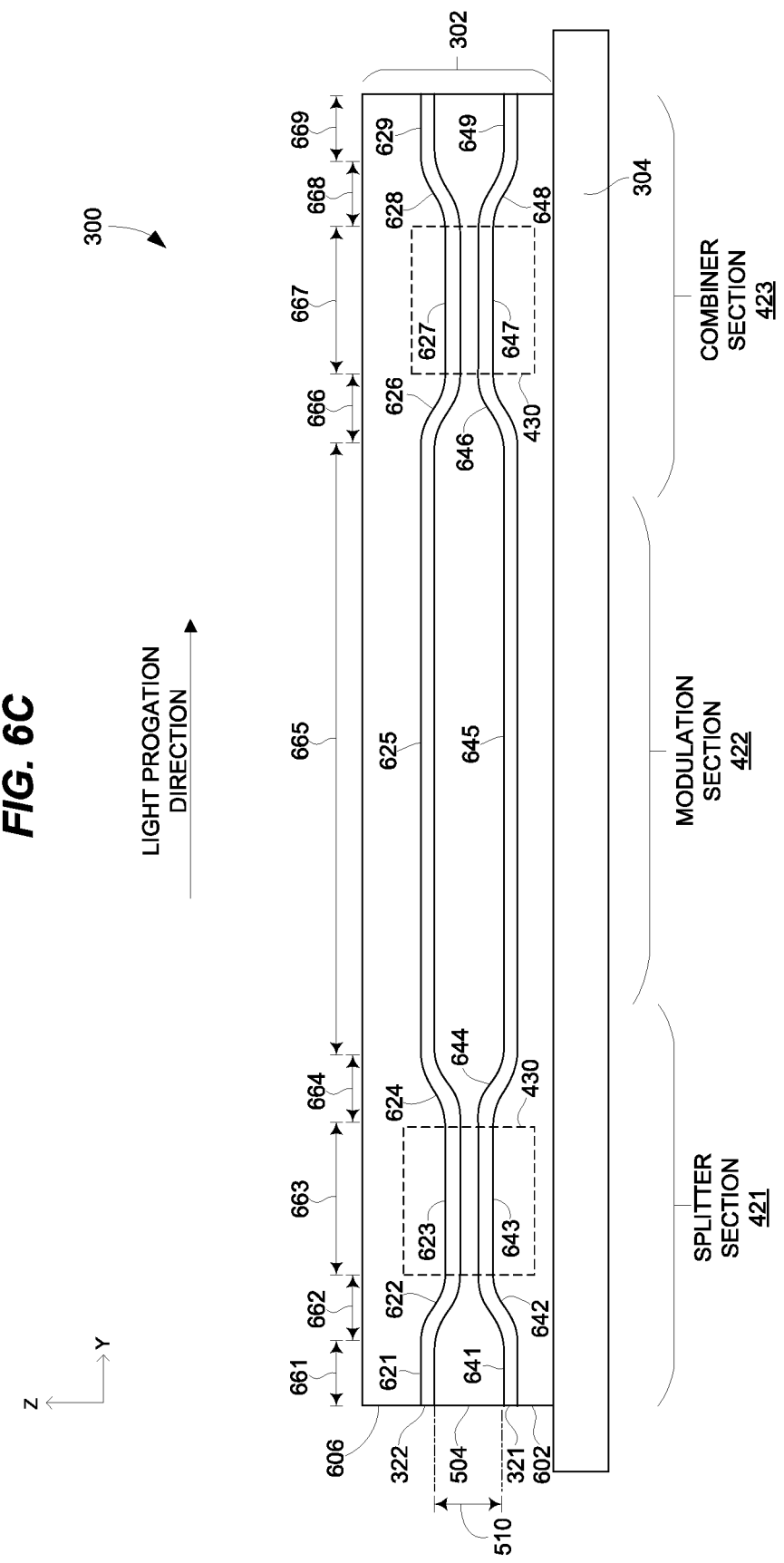

FIGS. 6A-6C are cross-sectional views of optical device 300 in illustrative embodiments. The views in FIGS. 6A-6C are across a vertical, longitudinal cut plane A-A as shown in FIG. 3. In these examples, waveguide structure 302 includes a lower optical cladding 602, lower optical core 321, intermediate optical cladding 504, upper optical core 322, and an upper optical cladding 606 (i.e., in the vertical direction along the z-axis). Lower optical cladding 602 is disposed longitudinally to extend along the length 330 of waveguide structure 302 between ends 308-309 (see FIG. 3). Lower optical core 321 is disposed longitudinally above and in contact with lower optical cladding 602 to extend along the length 330 of waveguide structure 302 between ends 308-309. Intermediate optical cladding 504 is disposed longitudinally above and in contact with lower optical core 321 to extend along the length 330 of waveguide structure 302 between ends 308-309. Upper optical core 322 is disposed longitudinally above and in contact with intermediate optical cladding 504 to extend along the length 330 of waveguide structure 302 between ends 308-309. Upper optical cladding 606 is disposed longitudinally above and in contact with upper optical core 322 to extend along the length 330 of waveguide structure 302 between ends 308-309. Lower optical waveguide 311 (see FIG. 3) is therefore formed by a sandwich of lower optical core 321 between lower optical cladding 602 and intermediate optical cladding 504 in the vertical direction. Upper optical waveguide 312 (see FIG. 3) is formed by a sandwich of upper optical core 322 between intermediate optical cladding 504 and upper optical cladding 606 in the vertical direction. Lower optical cladding 602 is optional in this embodiment, as lower optical core 321 may be grown directly on substrate 304 or on another layer, e.g., as a ridge optical core. Thus, the lower optical cladding 602 may refer to substrate 304, an optical cladding layer formed on substrate 304, or the lower optical cladding 602 may even be absent. Also, upper optical cladding 606 is optional in this embodiment. Additional elements of waveguide structure 302 may be incorporated as desired. Also, FIGS. 6A-6C are not drawn to scale.

The cladding thickness 510 (i.e., along the z-axis) of intermediate optical cladding 504 varies along the length 330 of waveguide structure 302 (i.e., in the longitudinal direction) from a greater thickness where lower optical core 321 and upper optical core 322 are optically uncoupled, to a lesser thickness where lower optical core 321 and upper optical core 322 are optically coupled in the optical coupling region 430 of splitter section 421 and the optical coupling region 430 of combiner section 423. Consequently, a vertical separation 520 between lower optical core 321 and upper optical core 322 varies along the length 330 of waveguide structure 302 to control whether lower optical core 321 and upper optical core 322 are optically coupled or uncoupled (see FIG. 5).

In the configuration of FIG. 6A (which may be considered a preferred configuration from a fabrication standpoint), lower optical core 321 is flat in the longitudinal direction. A thickness of lower optical core 321 may be (substantially) uniform or constant along length 330, or may vary along length 330 on a similar scale or proportion to the cladding thickness 510 of intermediate optical cladding 504 (e.g., thinner optical cladding, thinner optical core). Upper optical core 322 is non-straight, i.e., has bends and is not flat, in the longitudinal direction, meaning that upper optical core 322 bends or curves in the vertical direction. A thickness of upper optical core 322 may be (substantially) uniform along length 330, or may vary along length 330 on a similar scale or proportion to the cladding thickness 510 of intermediate optical cladding 504.

From left to right in FIG. 6A, upper optical core 322 includes a linear or straight segment 621 disposed horizontally (along the x-y axis) along a length 631, and the cladding thickness 510 of intermediate optical cladding 504 along length 631 is at an uncoupled thickness 512 sufficient to stop optical crosstalk between the two optical waveguides 311 and 312 (as labeled in FIG. 4). Upper optical core 322 further includes a transition segment 622 along a length 632 where upper optical core 322 bends or curves downward toward lower optical core 321, and then bends or curves back into a straight segment 623 disposed horizontally along a length 633. The cladding thickness 510 decreases along length 632 from an uncoupled thickness 512 to a coupled thickness 514, and remains at a coupled thickness 514 along length 633. The vertical optical coupling of upper optical core 322 and lower optical core 321 along length 633 represents the optical coupling region 430 of the splitter section 421 where light guided along lower optical core 321, for example, is coupled to upper optical core 322. Length 633 is set to a desired coupling or interaction length so that optical power is split between lower optical core 321 and upper optical core 322 (e.g., an about 50/50 power split).

Upper optical core 322 further includes a transition segment 624 along a length 634 where upper optical core 322 bends or curves upward away from lower optical core 321, and then bends or curves back into a straight segment 625 disposed horizontally along a length 635. The cladding thickness 510 increases along length 634 from a coupled thickness 514 to an uncoupled thickness 512, and remains at an uncoupled thickness 512 along length 635. Thus, upper optical core 322 and lower optical core 321 are optically uncoupled in the optical modulation section 422 where upper optical core 322 and lower optical core 321 form the optical modulation arms 404-405 of the optical modulator 400. For example, lower optical core 321 may be part of an optical phase shifter 424 along at least a portion or segment of length 635, and upper optical core 322 may be part of an optical phase shifter 425 along at least a portion or segment of length 635.

Upper optical core 322 further includes a transition segment 626 along a length 636 where upper optical core 322 bends or curves downward toward lower optical core 321, and then bends or curves back into a straight segment 627 disposed horizontally along a length 637. The cladding thickness 510 decreases along length 636 from an uncoupled thickness 512 to a coupled thickness 514, and remains at a coupled thickness 514 along length 637. The vertical optical coupling of upper optical core 322 and lower optical core 321 along length 637 represents the optical coupling region 430 of the combiner section 423 where light guided along lower optical core 321 combines with the light guided along upper optical core 322. Upper optical core 322 further includes a transition segment 628 along a length 638 where upper optical core 322 bends or curves upward away from lower optical core 321, and then bends or curves back into a straight segment 629 disposed horizontally along a length 639. The cladding thickness 510 increases along length 638 from a coupled thickness 514 to an uncoupled thickness 512, and remains at an uncoupled thickness 512 along length 639.

In the configuration of FIG. 6B, upper optical core 322 is generally straight in the longitudinal direction. A thickness of upper optical core 322 may be (substantially) uniform or constant along length 330, or may vary along length 330 on a similar scale or proportion to the cladding thickness 510 of intermediate optical cladding 504 (e.g., thinner optical cladding, thinner optical core). Lower optical core 321 is non-straight, i.e., has bends and is not flat, in the longitudinal direction. A thickness of lower optical core 321 may be (substantially) uniform or constant along length 330, or may vary along length 330 on a similar scale or proportion to the cladding thickness 510 of intermediate optical cladding 504.

From left to right in FIG. 6B, lower optical core 321 includes a straight segment 641 disposed horizontally (along the x-y axis) along a length 651, and the cladding thickness 510 of intermediate optical cladding 504 along length 651 comprises an uncoupled thickness 512. Lower optical core 321 further includes a transition segment 642 along a length 652 where lower optical core 321 bends or curves upward toward upper optical core 322, and then bends or curves back to a straight segment 643 that is disposed horizontally along a length 653. The cladding thickness 510 decreases along length 652 from an uncoupled thickness 512 to a coupled thickness 514, and remains at a coupled thickness 514 along length 653. The vertical optical coupling of upper optical core 322 and lower optical core 321 or corresponding guiding optical waveguides, along length 653 represents the optical coupling region 430 of the splitter section 421 where light guided along lower optical core 321, for example, is coupled to upper optical core 322. Length 653 is set to a desired coupling or interaction length so that optical power is split between lower optical core 321 and upper optical core 322 (e.g., about 50/50 power split).

Lower optical core 321 further includes a transition segment 644 along a length 654 where lower optical core 321 bends or curves downward away from upper optical core 322, and then bends or curves back into a straight segment 645 disposed horizontally along a length 655. The cladding thickness 510 increases along length 654 from a coupled thickness 514 to an uncoupled thickness 512, and remains at an uncoupled thickness 512 along length 655. Thus, upper optical core 322 and lower optical core 321 are optically uncoupled in the optical modulation section 422 where upper optical core 322 and lower optical core 321 form the optical modulation arms 404-405 of the optical modulator 400. For example, lower optical core 321 may be part of an optical phase shifter 424 along at least a portion or segment of length 655, and upper optical core 322 may be part of an optical phase shifter 425 along at least a portion or segment of length 655.

Lower optical core 321 further includes a transition segment 646 along a length 656 where lower optical core 321 bends or curves upward toward upper optical core 322, and then bends or curves back into a straight segment 647 disposed horizontally along a length 657. The cladding thickness 510 decreases along length 656 from an uncoupled thickness 512 to a coupled thickness 514, and remains at a coupled thickness 514 along length 657. The vertical optical coupling of upper optical core 322 and lower optical core 321 along length 657 represents the optical coupling region 430 of the combiner section 423 where light guided along lower optical core 321 combines with light guided along upper optical core 322. Lower optical core 321 further includes a transition segment 648 along a length 658 where lower optical core 321 bends or curves downward away from upper optical core 322, and then bends or curves back into a straight segment 649 disposed horizontally along a length 659. The cladding thickness 510 increases along length 658 from a coupled thickness 514 to an uncoupled thickness 512, and remains at an uncoupled thickness 512 along length 659.

In the configuration of FIG. 6C, lower optical core 321 is non-straight in the longitudinal direction. A thickness of lower optical core 321 may be (substantially) uniform along length 330, or may vary along length 330 on a similar scale or proportion to the cladding thickness 510 of intermediate optical cladding 504. Upper optical core 322 is also non-straight in the longitudinal direction. A thickness of upper optical core 322 may be (substantially) uniform along length 330, or may vary along length 330 on a similar scale or proportion to the cladding thickness 510 of intermediate optical cladding 504.

From left to right in FIG. 6C, upper optical core 322 includes a straight segment 621 disposed horizontally (along the x-y axis) and lower optical core 321 includes a straight segment 641 disposed horizontally along a length 661. The cladding thickness 510 of intermediate optical cladding 504 along length 661 is at an uncoupled thickness 512. Upper optical core 322 further includes a transition segment 622 along a length 662 where upper optical core 322 bends or curves downward toward lower optical core 321, and then bends or curves back into a straight segment 623 disposed horizontally along a length 663. Lower optical core 321 further includes a transition segment 642 along length 662 where lower optical core 321 bends or curves upward toward upper optical core 322, and then bends or curves back into a straight segment 643 that is disposed horizontally along length 663. The cladding thickness 510 decreases along length 662 from an uncoupled thickness 512 to a coupled thickness 514, and remains at a coupled thickness 514 along length 663. The vertical optical coupling of upper optical core 322 and lower optical core 321 along length 663 represents the optical coupling region 430 of the splitter section 421 where light guided along lower optical core 321, for example, is coupled to upper optical core 322. Length 663 is set to a desired coupling or interaction length so that optical power is split between lower optical core 321 and upper optical core 322 (e.g., about 50/50 power split).

Upper optical core 322 further includes a transition segment 624 along a length 664 where upper optical core 322 bends or curves upward away from lower optical core 321, and then bends or curves back into a straight segment 625 disposed horizontally along a length 665. Lower optical core 321 further includes a transition segment 644 along length 664 where lower optical core 321 bends or curves downward away from upper optical core 322, and then bends or curves back into a straight segment 645 disposed horizontally along length 665. The cladding thickness 510 increases along length 664 from a coupled thickness 514 to an uncoupled thickness 512, and remains at an uncoupled thickness 512 along length 665. Thus, upper optical core 322 and lower optical core 321 are optically uncoupled in the optical modulation section 422 where upper optical core 322 and lower optical core 321 form the optical modulation arms 404-405 of the optical modulator 400. For example, lower optical core 321 may be part of an optical phase shifter 424 along at least a portion or segment of length 665, and upper optical core 322 may be part of an optical phase shifter 425 along at least a portion or segment of length 665.

Upper optical core 322 further includes a transition segment 626 along a length 666 where upper optical core 322 bends or curves downward toward lower optical core 321, and then bends or curves back into a straight segment 627 disposed horizontally along a length 667. Lower optical core 321 further includes a transition segment 646 along length 666 where lower optical core 321 bends or curves upward toward upper optical core 322, and then bends or curves back into a straight segment 647 disposed horizontally along length 667. The cladding thickness 510 decreases along length 666 from an uncoupled thickness 512 to a coupled thickness 514, and remains at a coupled thickness 514 along length 667. The vertical optical coupling of upper optical core 322 and lower optical core 321 along length 667 represents the optical coupling region 430 of the combiner section 423 where light guided along lower optical core 321 combines with the light guided along upper optical core 322. Upper optical core 322 further includes a transition segment 628 along a length 668 where upper optical core 322 bends or curves upward away from lower optical core 321, and then bends or curves back into a straight segment 629 disposed horizontally along a length 669. Lower optical core 321 further includes a transition segment 648 along length 668 where lower optical core 321 bends or curves downward away from upper optical core 322, and then bends or curves back into a straight segment 649 disposed horizontally along length 669. The cladding thickness 510 increases along length 668 from a coupled thickness 514 to an uncoupled thickness 512, and remains at an uncoupled thickness 512 along length 669.

In one embodiment, additional optical core material may be formed between lower optical core 321 and upper optical core 322 to form the optical coupling regions 430 of waveguide structure 302. FIG. 7 is a cross-sectional view of optical device 300 in another illustrative embodiment. The view in FIG. 7 is across a vertical, longitudinal cut plane A-A as shown in FIG. 3. As before, waveguide structure 302 includes lower optical cladding 602, lower optical core 321 above lower optical cladding 602, intermediate optical cladding 504 above lower optical core 321, upper optical core 322 above intermediate optical cladding 504, and upper optical cladding 606 above upper optical core 322 (i.e., in the vertical direction along the z-axis). Lower optical cladding 602 is optional in this embodiment, as lower optical core 321 may be grown directly on substrate 304 or another layer. Thus, the lower optical cladding 602 may refer to substrate 304, or an optical cladding layer formed on substrate 304. Also, upper optical cladding 606 is optional in this embodiment. Additional elements of waveguide structure 302 may be incorporated as desired. Also, FIG. 7 is not drawn to scale.

In this embodiment, a cladding thickness 510 (i.e., along the z-axis) of intermediate optical cladding 504 between lower optical core 321 and upper optical core 322 is (substantially) uniform along the length 330 of waveguide structure 302. Consequently, a vertical separation 520 between lower optical core 321 and upper optical core 322 is (substantially) uniform along the length 330 of waveguide structure 302. In this configuration, lower optical core 321 is generally straight in the longitudinal direction. Similarly, upper optical core 322 is generally straight in the longitudinal direction. The cladding thickness 510 is uniform in the longitudinal direction at an uncoupled thickness 512 where lower optical core 321 and upper optical core 322 are optically uncoupled.

Waveguide structure 302 further includes intermediate optical core segments 720-721 interposed between lower optical core 321 and upper optical core 322 in the vertical direction. An intermediate optical core segment is an optical medium that guides light, much like lower optical core 321 and upper optical core 322, and may be formed from a similar material. To form the optical coupling region 430 of the splitter section 421, intermediate optical core segment 720 (or multiple intermediate optical core segments) is interposed between lower optical core 321 and upper optical core 322. To form the optical coupling region 430 of the combiner section 423, intermediate optical core segment 721 (or multiple intermediate optical core segments) is interposed between lower optical core 321 and upper optical core 322.

From left to right in FIG. 7, upper optical core 322 and lower optical core 321 are optically uncoupled along length 731. Intermediate optical core segment 720 is interposed between lower optical core 321 and upper optical core 322 along length 732, and upper optical core 322 and lower optical core 321 are optically coupled through intermediate optical core segment 720. The vertical optical coupling of upper optical core 322 and lower optical core 321 therefore represents the optical coupling region 430 of the splitter section 421 where light guided along lower optical core 321, for example, is coupled to upper optical core 322. The length 732 of intermediate optical core segment 720 is set to a desired coupling or interaction length so that optical power is split between lower optical core 321 and upper optical core 322 (e.g., about 50/50 power split).

Upper optical core 322 and lower optical core 321 are optically uncoupled again along length 733. Thus, upper optical core 322 and lower optical core 321 are optically uncoupled in the optical modulation section 422 where upper optical core 322 and lower optical core 321 form the optical modulation arms 404-405 of the optical modulator 400. For example, lower optical core 321 may be part of an optical phase shifter 424 along at least a portion or segment of length 733, and upper optical core 322 may be part of an optical phase shifter 425 along at least a portion or segment of length 733.

Intermediate optical core segment 721 is interposed between lower optical core 321 and upper optical core 322 along length 734, and upper optical core 322 and lower optical core 321 are optically coupled through intermediate optical core segment 721. The vertical optical coupling of upper optical core 322 and lower optical core 321 therefore represents the optical coupling region 430 of the combiner section 423 where light guided along lower optical core 321 combines with light guided along upper optical core 322. Upper optical core 322 and lower optical core 321 are again optically uncoupled along length 735.

Combinations of the configurations shown in FIGS. 6A-6C and 7 may be implemented in waveguide structure 302.

Figure 8A:
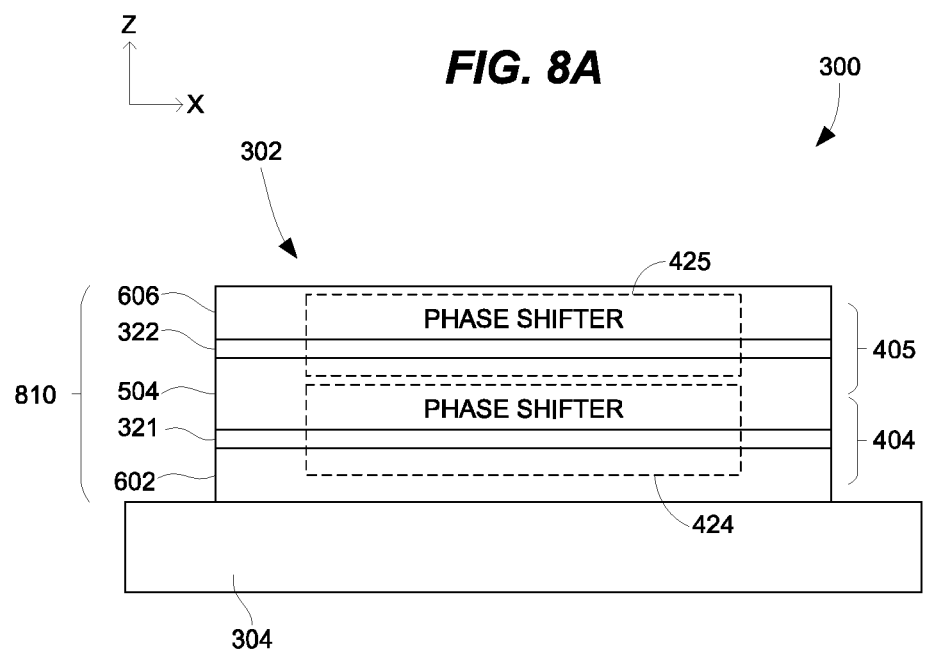
Figure 8B:
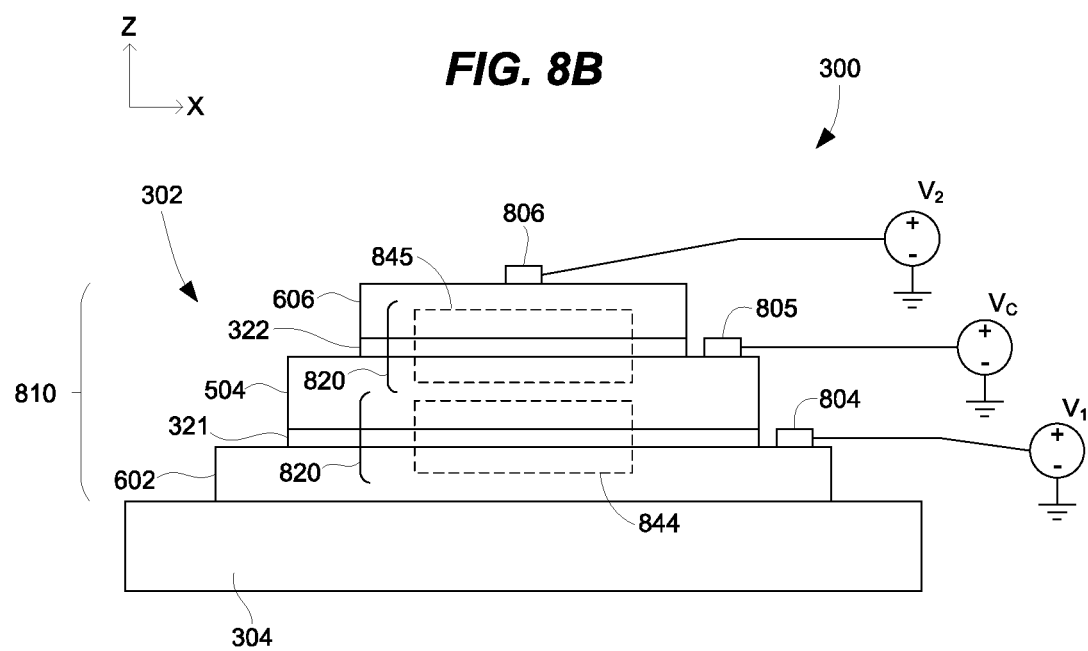

FIGS. 8A-8C are cross-sectional views of optical device 300 in an illustrative embodiment. The view in FIGS. 8A-8C is across a vertical, transverse cut plane B-B as shown in FIG. 3 at the optical modulation section 422 (see FIG. 4). In FIG. 8A, waveguide structure 302 includes lower optical cladding 602, lower optical core 321 above lower optical cladding 602, intermediate optical cladding 504 above lower optical core 321, upper optical core 322 above intermediate optical cladding 504, and upper optical cladding 606 above upper optical core 322 (i.e., in the vertical direction along the z-axis). Again, lower optical cladding 602 and upper optical cladding 606 are optional in this embodiment. Additional elements of waveguide structure 302 may be incorporated as desired. Also, FIG. 8A is not drawn to scale.

As is further evident in this figure, lower optical cladding 602, lower optical core 321, intermediate optical cladding 504, upper optical core 322, and upper optical cladding 606 are constructed or constituted to form a vertical stack 810. Within vertical stack 810, lower optical core 321 may be formed directly on lower optical cladding 602 (or substrate 304), intermediate optical cladding 504 may be formed directly on lower optical core 321, upper optical core 322 may be formed directly on intermediate optical cladding 504, and upper optical cladding 606 may be formed directly on upper optical core 322. Within the optical modulation section 422, vertical stack 810 forms the optical modulation arms 404-405 of the optical modulator 400 in a vertical manner (e.g., one on top of the other). One or both of the optical modulation arms 404-405 may be phase modulated with an optical phase shifter 424-425 disposed along a portion or segment of the optical modulation arms 404-405. For example, an optical phase shifter 424 may be configured to change the refractive index (n) of lower optical core 321 to slow or speed up propagation of light guided along lower optical core 321. Similarly, an optical phase shifter 425 may be configured to change the refractive index (n) of upper optical core 322 to slow or speed up propagation of light guided along upper optical core 322.

Optical phase shifters 424-425 may comprise electro-optic phase shifters, thermo-optic phase-shifters, a sequential combination thereof, or another type of optical phase shifter. FIG. 8B illustrates optical device 300 with electro-optic phase shifters 844-845. In this embodiment, an electrode 804 is formed on lower optical cladding 602 (or on substrate 304), an electrode 805 is formed on intermediate optical cladding 504, and an electrode 806 is formed on upper optical cladding 606. A doping profile for waveguide structure 302 creates a series of semiconductor junctions 820 in the vertical direction. Intermediate optical cladding 504 is accessed electrically through electrode 805, and is biased with a voltage $V_C$. Lower optical cladding 602 is accessed electrically through electrode 804, and electro-optic phase shifter 844 may be driven by application of a modulation voltage $V_1$. Upper optical cladding 606 is accessed electrically through electrode 806, and electro-optic phase shifter 845 may be driven by application of a modulation voltage $V_2$. Thus, electro-optic phase shifters 844-845 may be independently controlled through the radio-frequency (RF) modulation voltages $V_1$ and $V_2$. The doping profiles for waveguide structure 302 as shown in FIG. 8B may vary as desired to form a series of semiconductor junctions 820 in the vertical direction.

Figure 10:
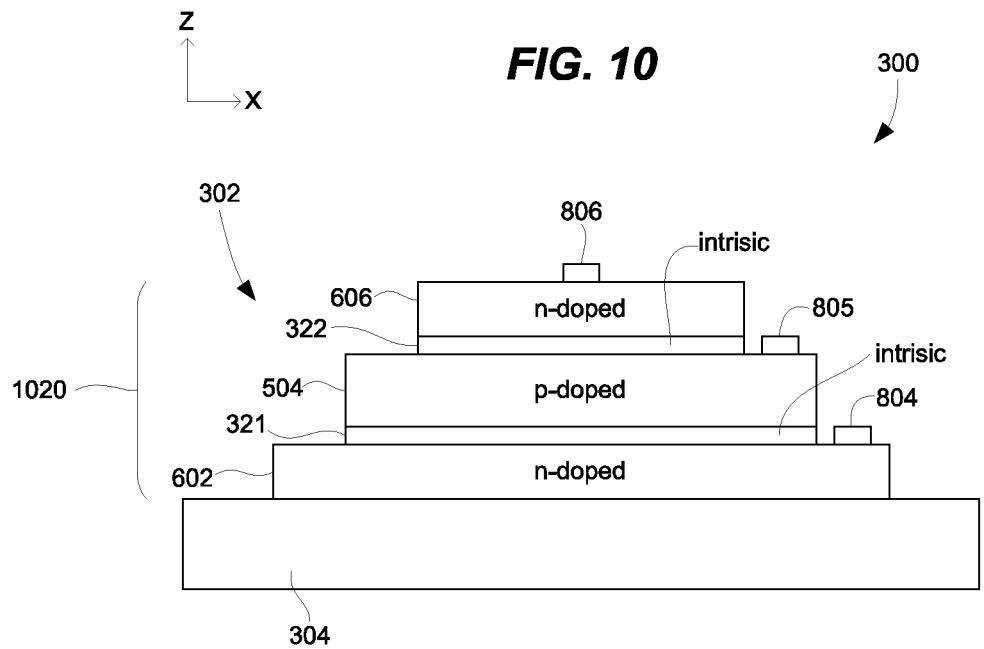

FIGS. 9-10 are cross-sectional views of optical device 300 in illustrative embodiments. The views in FIGS. 9-10 are across a vertical, transverse cut plane B-B as shown in FIG. 3 at the optical modulation section 422 (see FIG. 4). In FIG. 9, lower optical cladding 602 is a p-doped or p-type semiconductor material, lower optical core 321 is an undoped intrinsic semiconductor material, intermediate optical cladding 504 is an n-doped or n-type semiconductor material, upper optical core 322 is an undoped intrinsic semiconductor material, and upper optical cladding 606 is a p-doped or p-type semiconductor material. This doping profile creates a p-n-p semiconductor-junction structure in the vertical direction (i.e., vertically-stacked p-i-n-i-p junction 920).

In FIG. 10, lower optical cladding 602 is an n-doped or n-type semiconductor material, lower optical core 321 is an undoped intrinsic semiconductor material, intermediate optical cladding 504 is a p-doped or p-type semiconductor material, upper optical core 322 is an undoped intrinsic semiconductor material, and upper optical cladding 606 is an n-doped or n-type semiconductor material. This doping profile creates an n-p-n semiconductor-junction structure in the vertical direction (i.e., vertically-stacked n-i-p-i-n junction 1020).

FIG. 8C illustrates optical device 300 with thermo-optic phase shifters 854-855. In this embodiment, a heater 861 (or heating element) is formed or embedded in lower optical cladding 602 (or on substrate 304), and a heater 862 is formed or embedded in upper optical cladding 606. Thermo-optic phase shifter 854 may be driven by application of a modulation voltage $V_1$ to heater 861. Thermo-optic phase shifter 855 may be driven by application of a modulation voltage $V_2$ to heater 862. Thus, thermo-optic phase shifters 854-855 may be independently controlled through the modulation voltages $V_1$ and $V_2$.

In FIGS. 8A-8B and/or 9-10, one or more of electrodes 804-806 may include RF traveling wave segment(s) to enable higher modulation depth by approximate co-propagation of RF driving signals and light in the optical modulation section 422.

In FIGS. 8A-8B and/or 9-10, one or more of electrodes 804-806 may provide for DC biasing of semiconductor junctions, e.g., semiconductor junctions of optical modulation section 422 to be maintained in a reversed biased state.

In FIGS. 8A-8B and/or 9-10, the parallel optical modulation arms 404-405 may be driven in a push-pull manner to reduce power usage.

In FIGS. 8A-8B and/or 9-10, one of the parallel optical modulation arms 404-405 may include an electro-optic phase shifter 844-845, for data modulation, and a thermo-optic phase shifter 854-855 to provide a relative delay between light propagating through the two optical modulation arms 404-405. For example, such a relative delay may be used to enable PAM-N modulation, with N=4, 8, or 16.

One technical benefit of optical device 300 as described above is an optical modulator 400 is built vertically in waveguide structure 302 instead of horizontally. Lower optical core 321 and upper optical core 322 are formed in a vertical stack 810, and the vertical resolution for fabrication processes is highly-controllable. Also, building the waveguide structure 302 vertically in this manner allows for the optical device 300 to be more compact in size.

Figure 11:
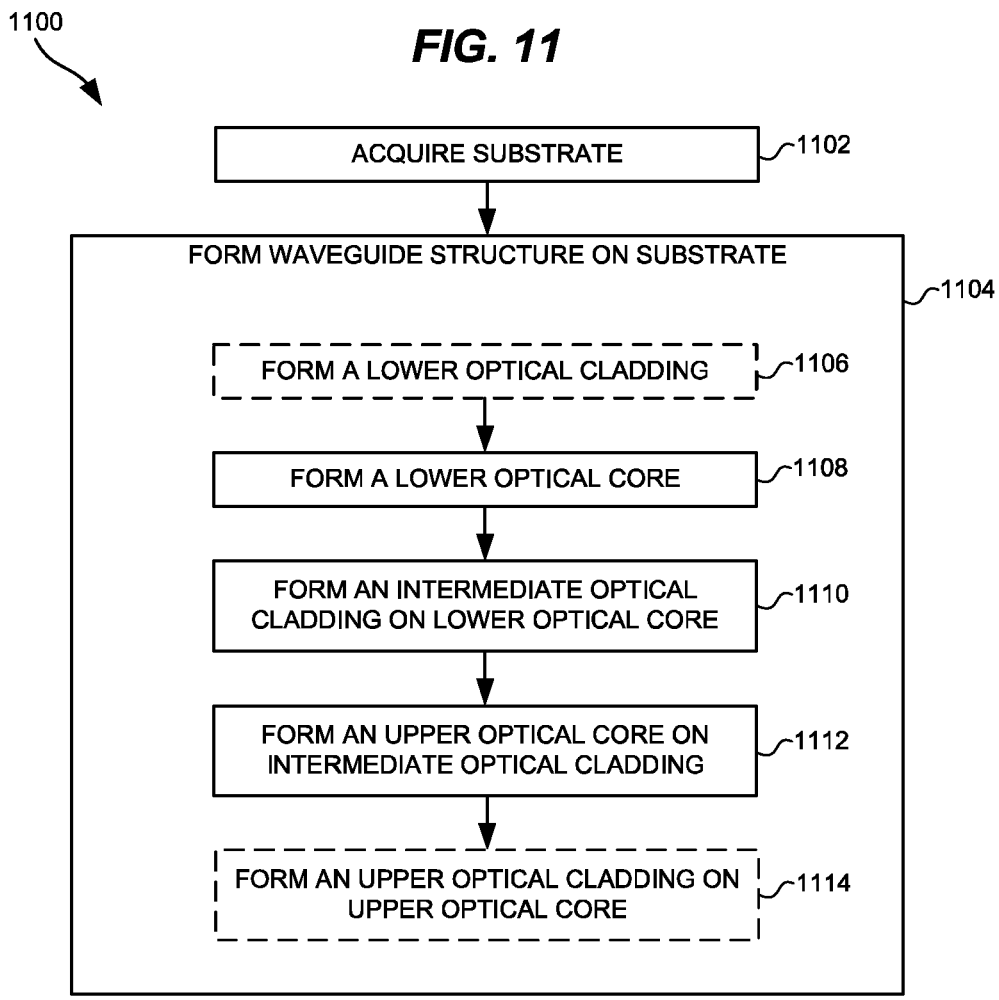
FIG. 11 is a flow chart illustrating a method of fabricating an optical device in an illustrative embodiment.

FIG. 11 is a flow chart illustrating a method 1100 of fabricating an optical device 300 in an illustrative embodiment. The steps of method 1100 will be described with reference to optical device 300 in FIG. 3, but those skilled in the art will appreciate that method 1100 may be performed to fabricate other optical devices. The steps of the flow charts described herein are not all inclusive and may include other steps not shown, and the steps may be performed in an alternative order.

Method 1100 includes the step of acquiring or obtaining a semiconductor substrate 304 (step 1102). Method 1100 further includes the step of forming a waveguide structure 302 on substrate 304 (step 1104). Waveguide structure 302 is formed as a vertical stack 810 of layers on a major surface (i.e., top surface 306) of substrate 304. Thus, forming waveguide structure 302 may include the step of forming a lower optical cladding 602 on substrate 304 (optional step 1106). For example, lower optical cladding 602 may be formed by growing epitaxial layers of crystalline optical cladding material on the top surface 306 of substrate 304. Although lower optical cladding 602 is described as being formed on substrate 304, one or more other layers may be formed on substrate 304 before lower optical cladding 602. As described above, forming a layer of optical cladding material on substrate 304 is optional, as the lower optical cladding 602 of waveguide structure 302 may comprise the substrate 304 itself, e.g., as a ridge optical waveguide.

Forming waveguide structure 302 further includes forming a lower optical core 321 such as on lower optical cladding 602 or on substrate 304 (step 1108). For example, a growth process may be used to form lower optical core 321 by growing epitaxial layers of crystalline semiconductor directly on lower optical cladding 602. The semiconductor for lower optical core 321 has a higher refractive index than the lower optical cladding 602 in embodiments with such a lower optical cladding 602.

Forming waveguide structure 302 further includes forming an intermediate optical cladding 504 on lower optical core 321 (step 1110). For example, a growth process may be used to form intermediate optical cladding 504 by growing epitaxial layers of crystalline semiconductor directly on a top surface of the lower optical core 321. The semiconductor for intermediate optical cladding 504 has a lower refractive index than lower optical core 321.

Forming waveguide structure 302 further includes forming an upper optical core 322 on intermediate optical cladding 504 (step 1112). For example, a growth process may be used to form upper optical core 322 by growing epitaxial layers of crystalline semiconductor directly on a top surface of intermediate optical cladding 504. The semiconductor for upper optical core 322 has a higher refractive index than intermediate optical cladding 504.

Forming waveguide structure 302 may further include forming an upper optical cladding 606 on upper optical core 322 (optional step 1114). For example, a growth process may be used to form upper optical cladding 606 by growing epitaxial layers of crystalline semiconductor directly on a top surface of upper optical core 322. The semiconductor for upper optical cladding 606 has a lower refractive index than upper optical core 322.

A result of method 1100 is a waveguide structure 302 formed on substrate 304 that includes a lower optical waveguide 311 comprising lower optical core 321 disposed longitudinally along the length 330 of waveguide structure 302, and an upper optical waveguide 312 comprising an upper optical core 322 disposed longitudinally along the length 330 of waveguide structure 302. Intermediate optical cladding 504 is interposed between lower optical core 321 and upper optical core 322 to define a vertical separation 520 between lower optical core 321 and upper optical core 322.

In one embodiment, substrate 304 and various layers may be formed from different crystalline, group III-V, semiconductor alloys. For example, substrate 304 may be made from InP, and lower optical cladding 602, intermediate optical cladding 504, and upper optical cladding 606 may be grown with InP semiconductor materials, such as with epitaxial growth. Lower optical core 321 and upper optical core 322 may be grown with InGaAs semiconductor materials, such as with epitaxial growth. By forming the optical core layers of a different III-V semiconductor alloy than the optical cladding layers, appropriate refractive index contrasts are produced between the optical core and optical cladding layers. The layers of optical device 300 may be formed from other III-V semiconductors, II-VI semiconductors, and possibly alternately from silicon, germanium and silicon germanium alloys. Also, although epitaxial growth processes were described above, other growth or deposition techniques may be used fabricate optical device 300.

In the method 1100, the formation of various optical cladding and optical core layers of the optical device 300 may also involve p-type and n-type doping lateral regions of various ones of the layers to produce p-n junctions or p-i-n junctions across segments of the optical waveguides, e.g., for high-speed, optical phase shifters. Such doping may involve fabrication and removal of masks to laterally control doping and providing/activating dopant impurities by conventional methods.

Method 1100 also includes formation of various metallic electrodes 804, 805, and 806 of FIGS. 8B, 9, and 10. The electrodes 804-806 may include RF traveling wave electrodes for RF driving optical modulator sections along p-n or p-i-n junctions, biasing electrodes for reverse biasing the p-n or p-i-n junctions, one or more ground electrodes, and/or operating electrodes for one or more thermo-optic phase shifters for setting a relative phase between light traversing different ones of the optical modulation arms.

Figure 12:
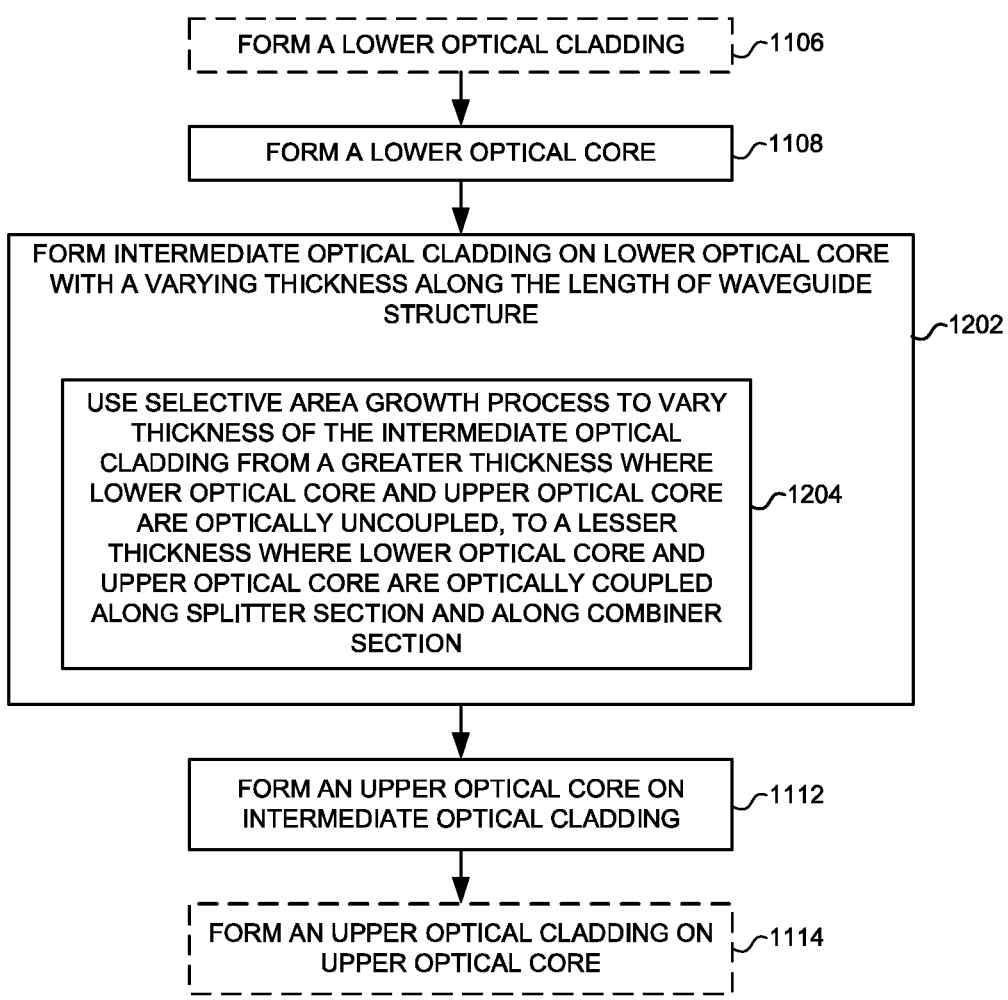
FIG. 12 is a flow chart illustrating a method of fabricating an optical device in an illustrative embodiment.
Figure 13:
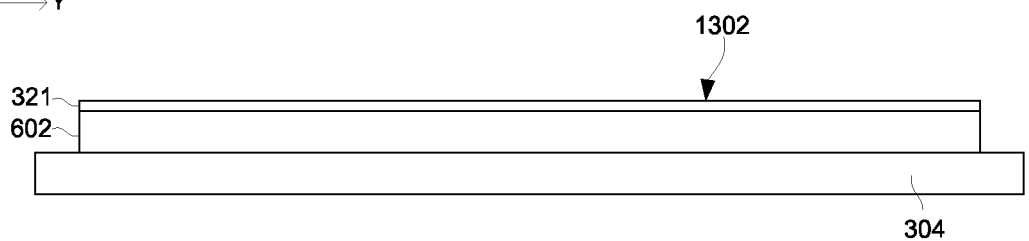
FIGS. 13-15 illustrate results of the fabrication steps of FIG. 12 in an illustrative embodiment.
Figure 14:
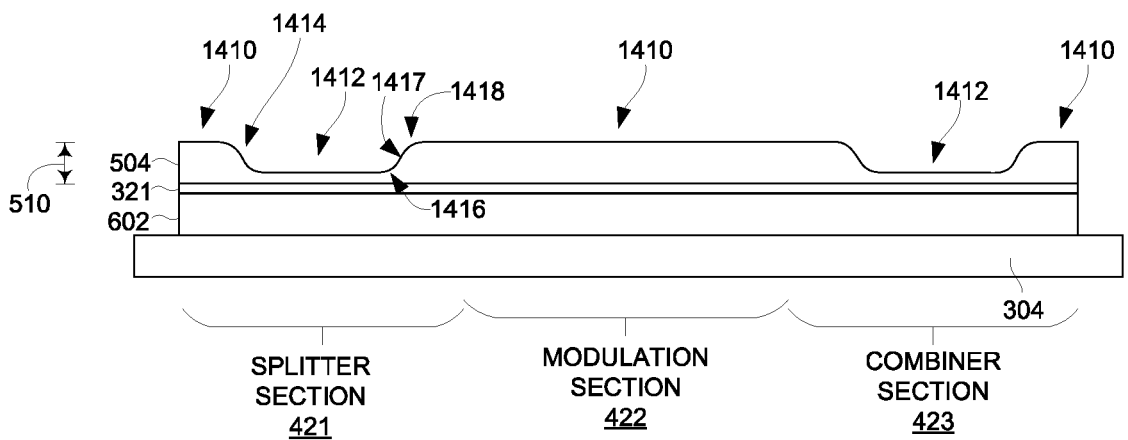
Figure 15:
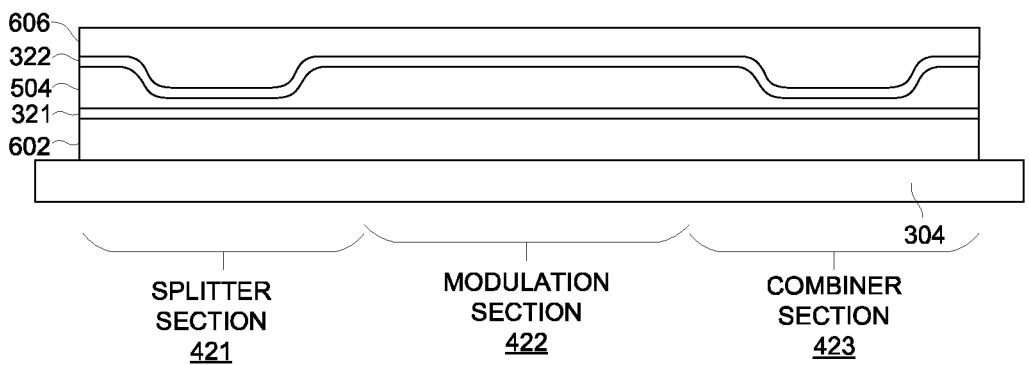

FIG. 12 is a flow chart illustrating a method 1200 of fabricating an optical device 300 in an illustrative embodiment. Method 1200 provides additional details for method 1100, and steps common between method 1200 and method 1100 are shown with the same reference number. FIGS. 13-15 illustrate results of the fabrication steps of FIG. 12.

For the example configuration shown in FIG. 6A, the cladding thickness 510 of intermediate optical cladding 504 varies along the length 330 of waveguide structure 302 to change the final vertical separation 520 between lower optical core 321 and upper optical core 322. In FIG. 12, method 1200 may include the step of forming lower optical cladding 602 (optional step 1102), and forming lower optical core 321 (step 1104). FIG. 13 illustrates lower optical cladding 602 formed on substrate 304, and lower optical core 321 formed on lower optical cladding 602. In FIG. 12, method 1200 may further include the step of forming intermediate optical cladding 504 on lower optical core 321 with a varying cladding thickness 510 along the length 330 of waveguide structure 302 (step 1202). More particularly, a selective area epitaxial growth process may be used to vary the cladding thickness 510 of intermediate optical cladding 504 from a greater thickness where the final lower optical core 321 and upper optical core 322 will be optically uncoupled, to a lesser thickness where the final lower optical core 321 and upper optical core 322 will be optically coupled in the optical coupling region 430 of splitter section 421 and the optical coupling region 430 of combiner section 423 (optional step 1204). FIG. 14 illustrates intermediate optical cladding 504 formed on lower optical core 321. For example, a selective area growth process may be used to grow epitaxial layers of the intermediate optical cladding 504 on the top surface 1302 of lower optical core 321, and vary the cladding thickness 510 along the length 330 of waveguide structure 302 when forming the splitter section 421, optical modulation section 422, and combiner section 423. The selective area growth process may selectively grow the semiconductor material of the intermediate optical cladding 504 to form plateaus 1410, valleys 1412, and curved transitions 1414 between the plateaus 1410 and valleys 1412. Thus, the selective area growth process may produce slower growth in the optical coupling regions 430 of the splitter section 421 and optical coupling region 430 of the combiner section 423. Thus, the cladding thickness 510 (see FIG. 5) of intermediate optical cladding 504 at valleys 1412 is the coupled thickness 514 where lower optical core 321 and upper optical core 322 are optically coupled. The selective area growth process may produce faster growth where lower optical core 321 and upper optical core 322 are to be optically uncoupled and produce curved transitions 1414 between the plateaus 1410 and the valleys 1412. The cladding thickness 510 of intermediate optical cladding 504 at plateaus 1410 is the uncoupled thickness 512 where lower optical core 321 and upper optical core 322 are to be optically uncoupled, e.g., at optical modulation section 422. At the curved transitions 1414, the cladding thickness 510 of the intermediate optical cladding 504 changes because the selective area growth process provides intermediate speed, epitaxial growth thereby causing a bend 1416 from a valley 1412 to a sloped face 1417, and another bend 1418 from the sloped face 1417 to a plateau 1410.

In selective area growth, the intermediate optical cladding 504 may be grown more slowly in the optical coupling regions 430 by performing the epitaxial growth in the presence of laterally bounding masks. The masks partially bound areas where slower epitaxial growth is desired and may function by slowing surface diffusion of growth material thereto during the epitaxial growth.

In FIG. 12, method 1200 may further include the step of forming upper optical core 322 on intermediate optical cladding 504 (step 1108), and forming upper optical cladding 606 on upper optical core 322 (optional step 1110), as shown in FIG. 15. Although method 1200 was illustrated as growing in separate steps as shown in FIGS. 13-15, a single epitaxial selective growth may be used to form waveguide structure 302 (optical cores and optical cladding).

Figure 16:
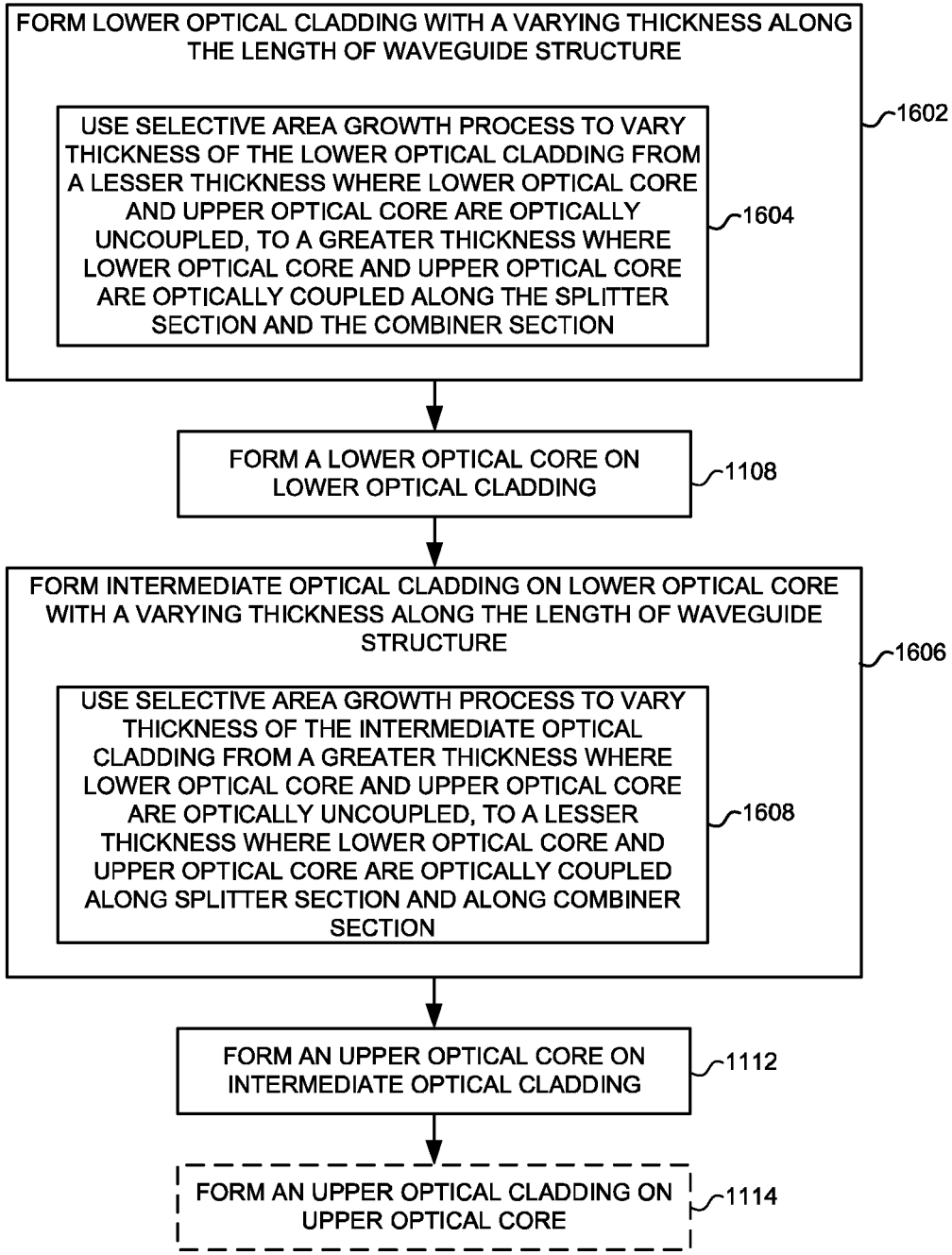
FIG. 16 is a flow chart illustrating a method of fabricating an optical device in an illustrative embodiment.

FIG. 16 is a flow chart illustrating a method 1600 of fabricating an optical device 300 in an illustrative embodiment. Method 1600 provides additional details for method 1100, and steps common between method 1600 and method 1100 are shown with the same reference number. FIGS. 17-20 illustrate results of the fabrication steps of FIG. 16.

Figure 17:
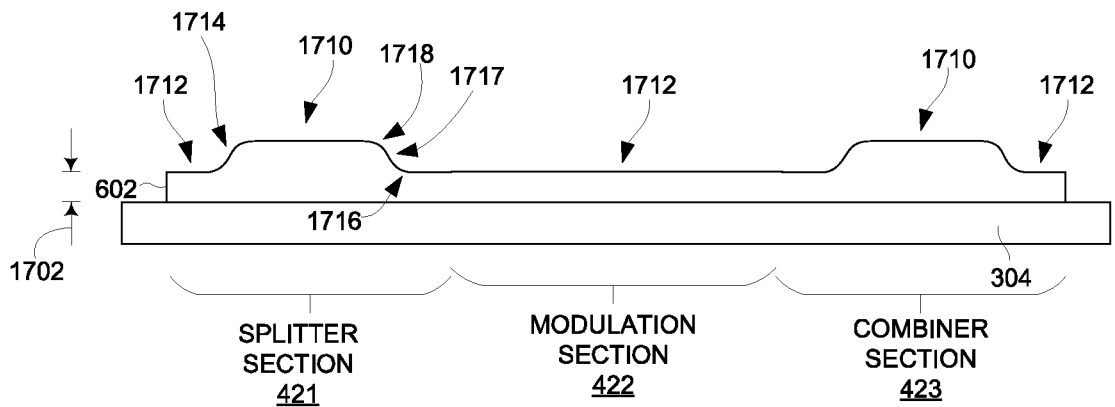
FIGS. 17-20 illustrate results of the fabrication steps of FIG. 16 in an illustrative embodiment.

For the example configuration shown in FIG. 6B, the thickness of lower optical cladding 602 and intermediate optical cladding 504 varies along the length 330 of waveguide structure 302 to change the vertical separation 520 between lower optical core 321 and upper optical core 322. As shown in FIG. 16, method 1600 may include the step of forming lower optical cladding 602 with a varying thickness along the length 330 of waveguide structure 302 (step 1602). More particularly, a selective area growth process may be used to vary the thickness of lower optical cladding 602 from a lesser thickness where lower optical core 321 and upper optical core 322 are optically uncoupled, to a greater thickness where lower optical core 321 and upper optical core 322 are optically coupled in the optical coupling region 430 of splitter section 421 and the optical coupling region 430 of combiner section 423 (optional step 1604). FIG. 17 illustrates lower optical cladding 602 formed on substrate 304. For example, a selective area growth process may be used to grow epitaxial layers of the lower optical cladding 602 on the top surface 306 of substrate 304, and vary the cladding thickness 1702 along the length 330 of waveguide structure 302 when forming the splitter section 421, optical modulation section 422, and combiner section 423. The selective area growth process may selectively grow the semiconductor material of lower optical cladding 602 to form plateaus 1710, valleys 1712, and curved transitions 1714 between the plateaus 1710 and valleys 1712. Thus, the selective area growth process may grow a plateau 1710 in the optical coupling region 430 of the splitter section 421 where lower optical core 321 and upper optical core 322 are to be optically coupled, and a plateau 1710 in the optical coupling region 430 of the combiner section 423 where lower optical core 321 and upper optical core 322 are to be optically coupled. The selective area growth process may produce slower growth where lower optical core 321 and upper optical core 322 are to be optically uncoupled and produce curved transitions 1714 between the plateaus 1710 and the valleys 1712. At the curved transitions 1714, the cladding thickness 1702 of the lower optical cladding 602 changes because the selective area growth process provides intermediate speed, epitaxial growth thereby causing a bend 1716 from a valley 1712 to a sloped face 1717, and another bend 1718 from the sloped face 1717 to a plateau 1710.

Figure 18:
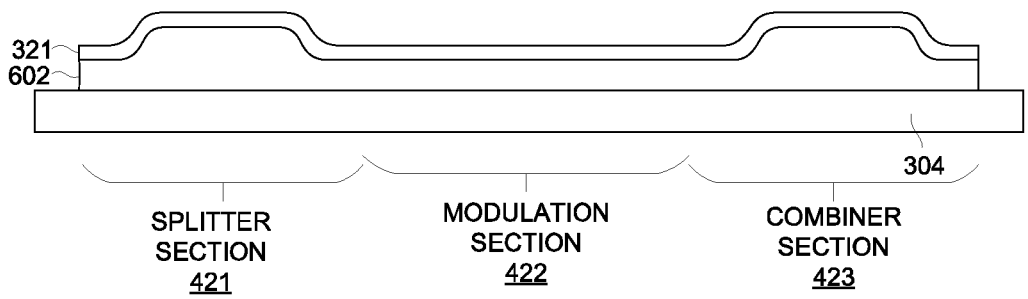

In FIG. 16, method 1600 may further include the step of forming lower optical core 321 on lower optical cladding 602 (step 1104), as shown in FIG. 18. The growth process may grow epitaxial layers of semiconductor material for lower optical core 321 on the top surface of lower optical cladding 602.

Figure 19:
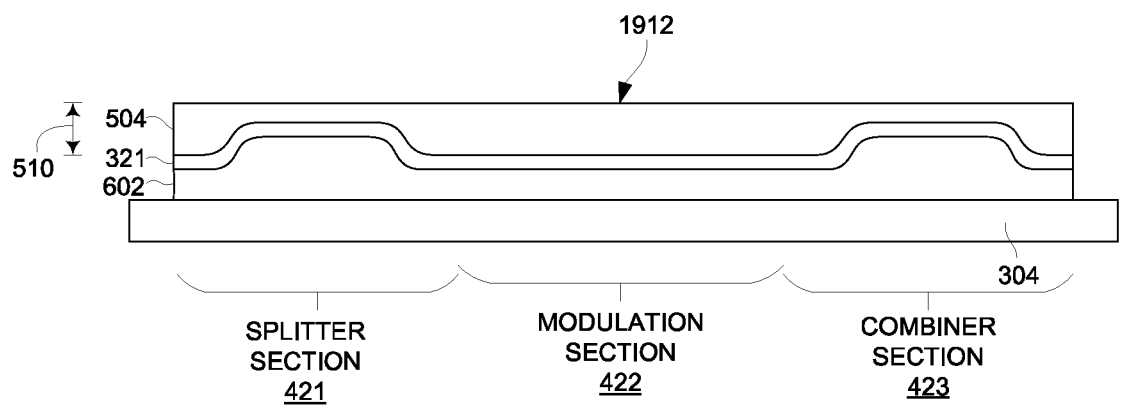

In FIG. 16, method 1600 may further include the step of forming intermediate optical cladding 504 on lower optical core 321 with a varying cladding thickness 510 along the length 330 of waveguide structure 302 (step 1606), as shown in FIG. 19. More particularly, a selective area growth process may be used to vary the cladding thickness 510 of intermediate optical cladding 504 from a greater thickness where lower optical core 321 and upper optical core 322 are optically uncoupled, to a lesser thickness where lower optical core 321 and upper optical core 322 are optically coupled in the optical coupling region 430 of splitter section 421 and the optical coupling region 430 of combiner section 423 (optional step 1608). The growth process may grow epitaxial layers of semiconductor material for intermediate optical cladding 504 on the top surface of lower optical core 321. The cladding thickness 510 of intermediate optical cladding 504 may vary along the length 330 of the waveguide structure 302 so that a planar top surface 1912 is formed by intermediate optical cladding 504. However, the top surface 1912 of intermediate optical cladding 504 may not be planar in other embodiments.

Figure 20:
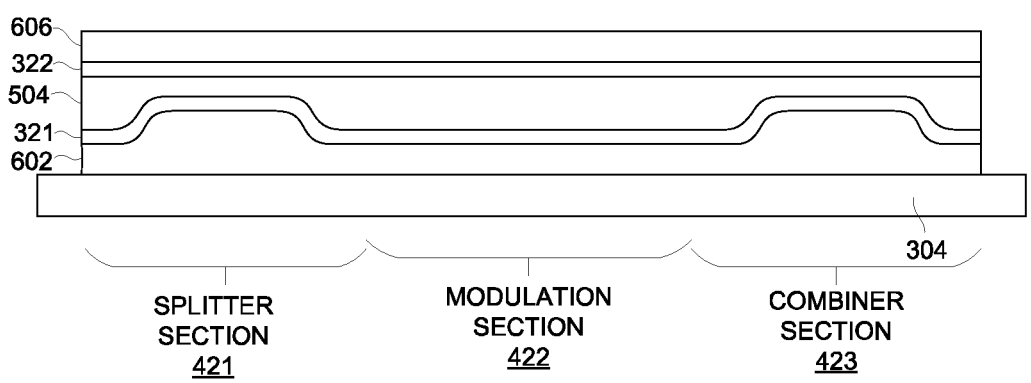

In FIG. 16, method 1600 may further include the step of forming upper optical core 322 on intermediate optical cladding 504 (step 1108), and forming upper optical cladding 606 on upper optical core 322 (optional step 1110), as shown in FIG. 20. Although method 1600 was illustrated as growing in separate steps as shown in FIGS. 17-20, a single epitaxial selective growth may be used to form waveguide structure 302 (optical cores and optical cladding).

A combination of method 1200 and method 1600 may be used to form a waveguide structure 302 having the configuration shown in FIG. 6C.

Figure 21:
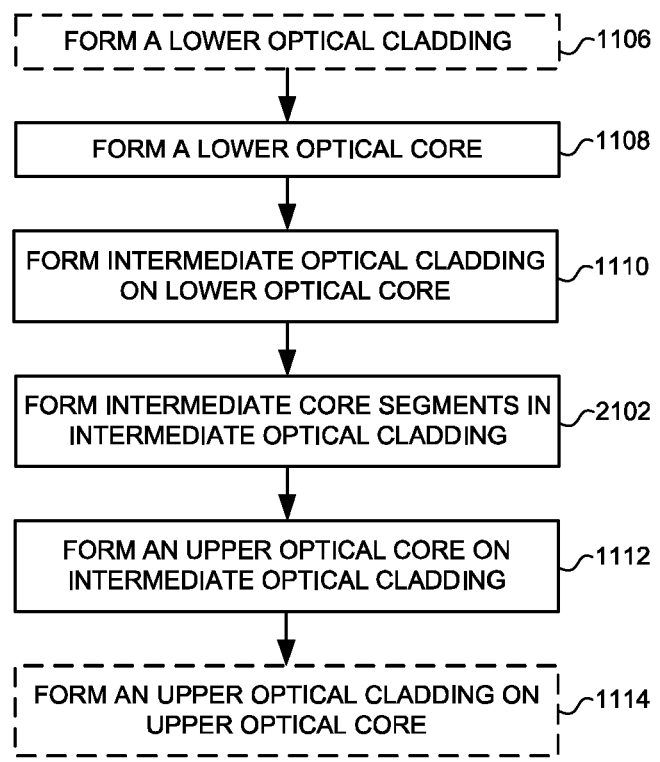
FIG. 21 is a flow chart illustrating a method of fabricating an optical device in an illustrative embodiment.

FIG. 21 is a flow chart illustrating a method 2100 of fabricating an optical device 300 in an illustrative embodiment. Method 2100 provides additional details for method 1100, and steps common between method 2100 and method 1100 are shown with the same reference number. FIGS. 22-28 illustrate results of the fabrication steps of FIG. 21.

Figure 22:
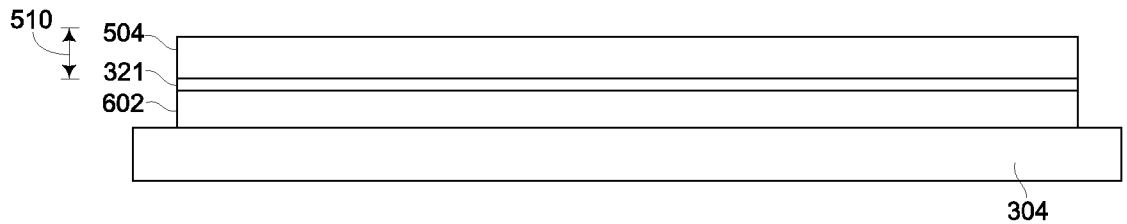

For the example configuration shown in FIG. 7, intermediate optical core segments 720-721 are implemented in the optical coupling regions 430. In FIG. 21, method 2100 may include the step of forming lower optical cladding 602 (optional step 1102), and forming lower optical core 321 (step 1104). Method 2100 may further include the step of forming intermediate optical cladding 504 on lower optical core 321 (step 1106). FIG. 22 illustrates lower optical cladding 602 formed on substrate 304, lower optical core 321 formed on lower optical cladding 602, and intermediate optical cladding 504 formed on lower optical core 321. In this example, intermediate optical cladding 504 may be formed with a (substantially) uniform thickness. The cladding thickness 510 of intermediate optical cladding 504 is an uncoupled thickness 512.

Figure 23:
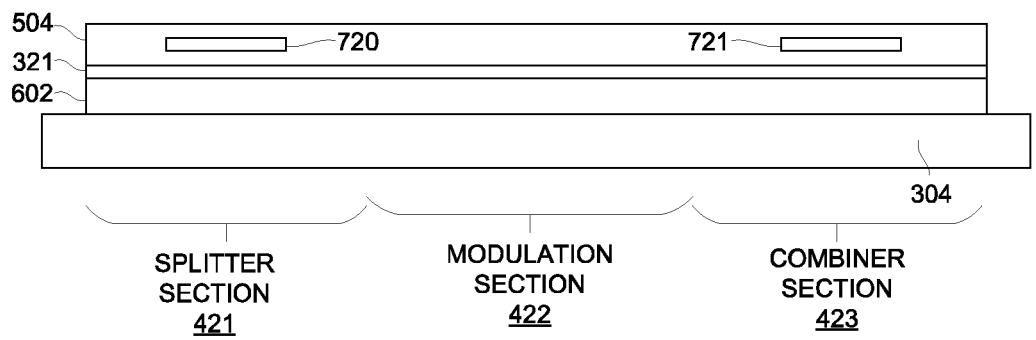
Figure 24:
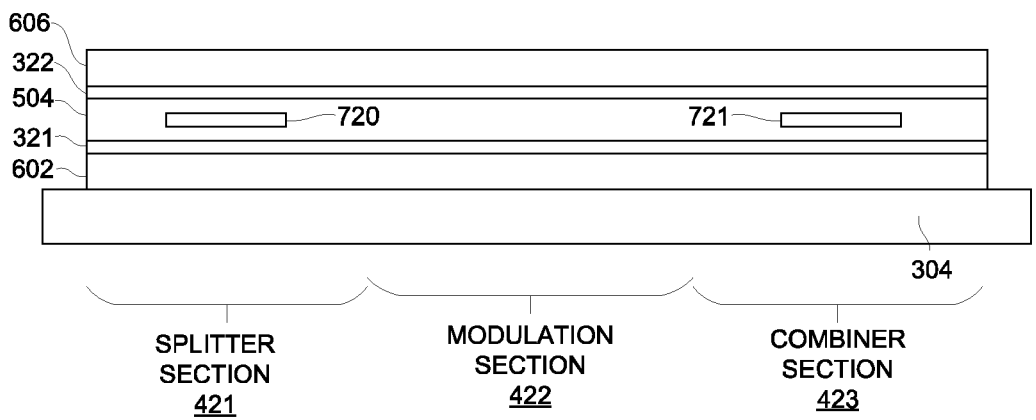

In FIG. 21, method 2100 may further include the step of forming the intermediate optical core segments 720-721 in intermediate optical cladding 504 (step 2102). FIG. 23 illustrates intermediate optical core segments 720-721 formed in intermediate optical cladding 504. In FIG. 21, method 2100 may further include the steps of forming upper optical core 322 on intermediate optical cladding 504 (step 1108), and upper optical cladding 606 on upper optical core 322 (optional step 1110), as shown in FIG. 24.

The steps of forming the intermediate optical core segments 720-721 in intermediate optical cladding 504 (step 2102) may be performed in a variety of ways. In one embodiment, a portion of intermediate optical cladding 504 may be removed in the optical coupling region 430 of the splitter section 421 and in the optical coupling region 430 of the combiner section 423, as shown in FIG. 25. For example, a removal process may be used to form cutouts 2510 in intermediate optical cladding 504 for the intermediate optical core segments 720-721. The intermediate optical core segments 720-721 may then be formed in the cutouts 2510, as shown in FIG. 26. For example, a growth process may grow epitaxial layers of semiconductor material for the intermediate optical core segments 720-721 in the cutouts 2510 in intermediate optical cladding 504. The intermediate optical cladding 504 may then be formed on the intermediate optical core segments 720-721, as shown in FIG. 23. For example, a growth process may be used to form intermediate optical cladding 504 by growing epitaxial layers or films of semiconductor material on the intermediate optical core segments 720-721.

Figure 27:
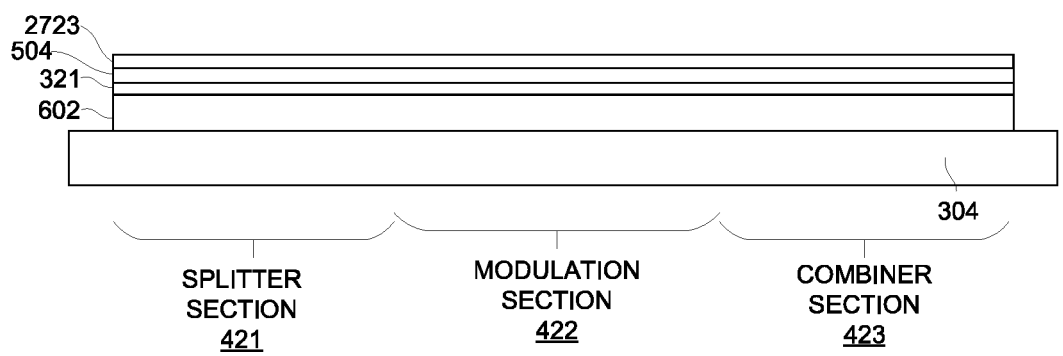
Figure 28:
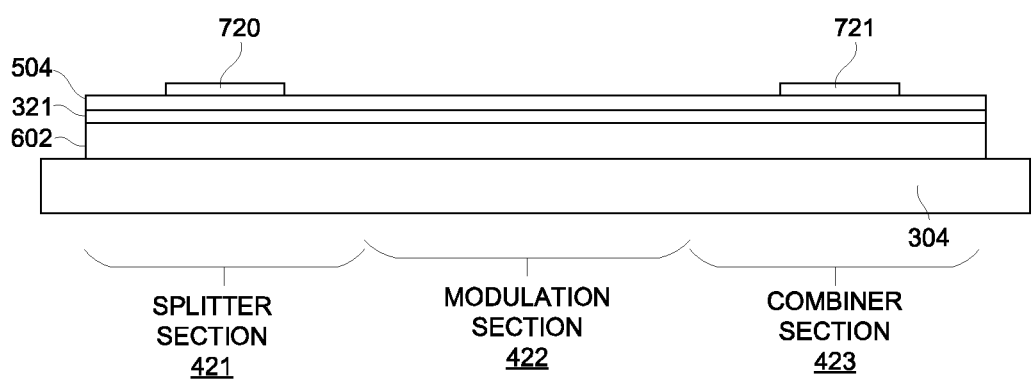

In one embodiment, a portion of intermediate optical cladding 504 may be formed on lower optical core 321, and an intermediate optical core 2723 may be formed on intermediate optical cladding 504, as shown in FIG. 27. Portions of intermediate optical core 2723 may be removed outside of the optical coupling region 430 of the splitter section 421 and outside of the optical coupling region 430 of the combiner section 423 to form the intermediate optical core segments 720-721, as shown in FIG. 28. The remaining intermediate optical cladding 504 may then be formed on the intermediate optical core segments 720-721, as shown in FIG. 23.

Although specific embodiments were described herein, the scope of the disclosure is not limited to those specific embodiments. The scope of the disclosure is defined by the following claims and any equivalents thereof.

What is claimed is:

1. An optical device, comprising:
   a semiconductor substrate having a major surface; and
   an optical waveguide structure formed vertically on the major surface, the optical waveguide structure comprising a lower optical core, an upper optical core, and an intermediate optical cladding;
   wherein at least one of the lower and upper optical cores extends from a first end of the optical waveguide structure to a second end thereof;
   wherein the upper optical core is vertically above the lower optical core in a vertical direction perpendicular to the major surface and the intermediate optical cladding separates and is in contact with the optical cores;
   wherein a cladding thickness of the intermediate optical cladding in the vertical direction varies along a length of the optical waveguide structure so that the optical cores are optically coupled in first and second sections of the optical waveguide structure near the respective first and second ends, and are optically uncoupled in a third section between the first and second sections;
   wherein the intermediate optical cladding is formed with a growth process that selectively grows semiconductor material of the intermediate optical cladding on the lower optical core to vary the cladding thickness from a greater thickness in the third section to a lesser thickness in the first and second sections;
   wherein the optical waveguide structure has a parallel pair of optical waveguides extending from the first section to the second section, a lower optical waveguide of the parallel pair includes the lower optical core and an upper optical waveguide of the parallel pair includes the upper optical core;
   wherein the lower optical waveguide and the upper optical waveguide are vertically stacked with the upper optical waveguide disposed above the lower optical waveguide in the vertical direction such that a vertical plane intersects both the lower optical core and the upper optical core in the first, second, and third sections.

2. The optical device of claim 1, wherein a separation of the optical cores is less in the first and second sections than between the first and second sections.

3. The optical device of claim 1, wherein the lower optical core, the intermediate optical cladding, and the upper optical core are semiconductor layers.

4. The optical device of claim 3, wherein the lower optical core, the intermediate optical cladding, and the upper optical core are III-V semiconductors.

5. The optical device of claim 3, wherein the optical waveguide structure includes a p-n-p or an n-p-n semiconductor-junction structure along a direction perpendicular to the major surface.

6. The optical device of claim 1, wherein the optical waveguide structure further comprises a lower optical cladding on the semiconductor substrate, the lower optical core being above a part of the lower optical cladding in the vertical direction and in contact with the lower optical cladding.

7. The optical device of claim 1, wherein the optical waveguide structure further comprises:
a lower optical cladding separating the lower optical core from the semiconductor substrate; and
an upper optical cladding formed on the upper optical core.

8. The optical device of claim 1, wherein the optical device comprises a Mach-Zehnder optical modulator, the optical waveguides of the parallel pair being parallel optical arms of the Mach-Zehnder optical modulator, at least one of the optical arms having a segment configured as an electro-optical phase shifter.

9. The optical device of claim 8, wherein at least one of the optical waveguides has a thermo-optical phase shifter along a segment thereof.

10. The optical device of claim 8, wherein the Mach-Zehnder optical modulator comprises one or more radio frequency traveling wave electrodes along the segment of the at least one of the optical arms.

11. The optical device of claim 8, wherein the segment of the at least one of the optical arms includes a semiconductor junction therealong, the semiconductor junction being in the optical waveguide structure.

12. A method of fabricating an optical device having an optical waveguide structure, the method comprising:
acquiring a semiconductor substrate; and
forming the optical waveguide structure vertically on a major surface of the semiconductor substrate;
wherein the forming the optical waveguide structure comprises:
forming a lower optical core;
forming an intermediate optical cladding on the lower optical core; and
forming an upper optical core on the intermediate optical cladding;
wherein at least one of the lower and upper optical cores extends from a first end of the optical waveguide structure to a second end thereof;
wherein the upper optical core is vertically above the lower optical core in a vertical direction perpendicular to the major surface and the intermediate optical cladding separates and is in contact with the optical cores;
wherein a cladding thickness of the intermediate optical cladding in the vertical direction varies along a length of the optical waveguide structure so that the optical cores are optically coupled in first and second sections of the optical waveguide structure near the respective first and second ends, and are optically uncoupled in a third section between the first and second sections;
wherein the forming of the intermediate optical cladding comprises forming the intermediate optical cladding with a growth process that selectively grows semiconductor material of the intermediate optical cladding on the lower optical core to vary the cladding thickness from a greater thickness in the third section to a lesser thickness in the first and second sections;
wherein the optical waveguide structure has a parallel pair of optical waveguides extending from the first section to the second section, a lower optical waveguide of the parallel pair includes the lower optical core and an upper optical waveguide of the parallel pair includes the upper optical core;
wherein the lower optical waveguide and the upper optical waveguide are vertically stacked with the upper optical waveguide disposed above the lower optical waveguide in the vertical direction such that a vertical plane intersects both the lower optical core and the upper optical core in the first, second, and third sections.

13. The method of claim 12, wherein:
the optical device comprises a Mach-Zehnder optical modulator, the optical waveguides of the parallel pair being parallel optical arms of the Mach-Zehnder optical modulator.

14. The optical device of claim 1, wherein:
the lower optical core is straight and the upper optical core is non-straight along the length of the optical waveguide structure; and
the cladding thickness of the intermediate optical cladding varies from a greater thickness where the lower optical core and the upper optical core are optically uncoupled in the third section, to a lesser thickness where the lower optical core and the upper optical core are optically coupled in the first and second sections.

15. The optical device of claim 1, wherein:
the upper optical core is straight and the lower optical core is non-straight along the length of the optical waveguide structure; and
the cladding thickness of the intermediate optical cladding varies from a greater thickness where the lower optical core and the upper optical core are optically uncoupled in the third section, to a lesser thickness where the lower optical core and the upper optical core are optically coupled in the first and second sections.

16. The optical device of claim 1, wherein:
the upper optical core is non-straight and the lower optical core is non-straight along the length of the optical waveguide structure; and
the cladding thickness of the intermediate optical cladding varies from a greater thickness where the lower optical core and the upper optical core are optically uncoupled in the third section, to a lesser thickness where the lower optical core and the upper optical core are optically coupled in the first and second sections.

17. The optical device of claim 1, wherein:
thicknesses of the lower optical core and the upper optical core are uniform along the length of the optical waveguide structure.

18. The optical device of claim 8, wherein:
the first section operates as an optical power splitter of the Mach-Zehnder optical modulator; and
the second section operates as an optical power combiner of the Mach-Zehnder optical modulator.

* * * * *